(12) United States Patent
Venderbosch et al.

(10) Patent No.: US 9,365,776 B2
(45) Date of Patent: Jun. 14, 2016

(54) PROCESS FOR THE HYDROTREATMENT OF VEGETAL MATERIALS

(75) Inventors: Robertus Hendrikus Venderbosch, Enschede (NL); Agnes Retno Ardiyanti, Zwolle (NL); Hero Jan Heeres, Harkstede (NL); Vadim Yakovlev, Novosibirsk (RU); Dmitry Ermakov, Novosibirsk (RU); Sofia Khromova, Novosibirsk (RU); Valentin Parmon, Novosibirsk (RU)

(73) Assignee: BTG BIOMASS TECHNOLOGY GROUP B.V., Enschede (NL)

( * ) Notice: Subject to any disclaimer, the term of this patent is extended or adjusted under 35 U.S.C. 154(b) by 670 days.

(21) Appl. No.: 13/818,562

(22) PCT Filed: Aug. 30, 2011

(86) PCT No.: PCT/NL2011/050588
§ 371 (c)(1),
(2), (4) Date: May 1, 2013

(87) PCT Pub. No.: WO2012/030215
PCT Pub. Date: Mar. 8, 2012

(65) Prior Publication Data
US 2013/0219774 A1    Aug. 29, 2013

(30) Foreign Application Priority Data

Aug. 30, 2010 (NL) ................................... 2005292
Aug. 30, 2010 (RU) ............................... 2010135823

(51) Int. Cl.
*C07C 1/00* (2006.01)
*C10G 1/00* (2006.01)
(Continued)

(52) U.S. Cl.
CPC ............... *C10G 1/002* (2013.01); *B01J 23/002* (2013.01); *B01J 23/755* (2013.01); *B01J 23/825* (2013.01);
(Continued)

(58) Field of Classification Search
CPC .................... C10G 2300/1011; Y02E 50/14
USPC ................................. 585/240; 44/605
See application file for complete search history.

(56) References Cited

U.S. PATENT DOCUMENTS 7,550,634 B2 *  6/2009  Yao ........................... C10L 1/08
                                                        208/142
7,578,927 B2 *  8/2009  Marker .................. C10G 45/02
                                                        208/67

(Continued)

FOREIGN PATENT DOCUMENTS

WO        2010002886          1/2010

OTHER PUBLICATIONS

"Hydrotreatment of Fast Pyrolysis Oil Using Heterogeneous Noble-Metal Catalysts", Heeres et al., Ind. Eng. Chem. Res, 2009, 48, 10324-10334.*

(Continued)

*Primary Examiner* — Nina Bhat
(74) *Attorney, Agent, or Firm* — Edward J. Baba; Bozicevic, Field & Francis LLP

(57) ABSTRACT

The present invention relates to a process for the hydrotreatment of a vegetal biomass. Specifically, the present invention relates to a process for the hydrotreatment of a vegetal biomass comprising: a) subjecting said vegetal biomass to a hydrotreatment in a first reactor, said hydrotreatment comprises contacting said vegetal biomass in an aqueous medium and a metal oxide, a mixed metal oxide, or a metal-metalloid oxide catalyst comprising at least 35% by weight of metal oxide, mixed metal oxide, or metal-metalloid oxide relative to the total weight of the catalyst, with hydrogen at a pressure in the range of 10 to 400 bar and at a temperature in the range of 50° C. to 300° C. until a predetermined level of the hydrotreatment of said biomass is obtained and wherein the metal oxide, a mixed metal oxide, or a metal-metalloid oxide catalyst comprises nickel. Further, the present invention relates to a metal oxide, mixed metal oxide or metal-metalloid oxide catalyst. Furthermore, the present invention relates to the use of the catalyst.

22 Claims, 8 Drawing Sheets

Figure 1:
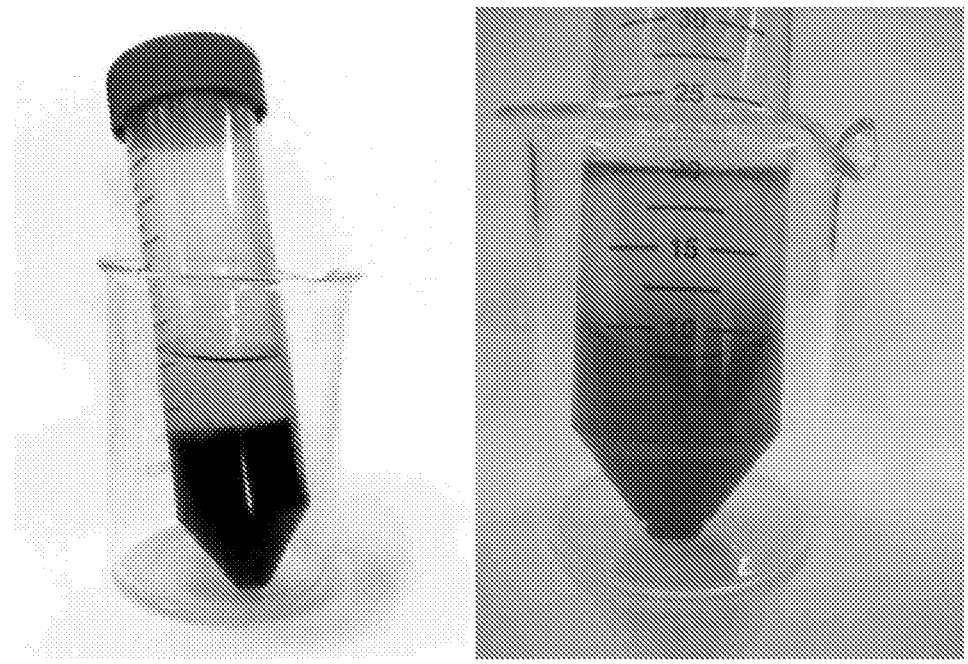

(51) Int. Cl.

| | |
|---|---|
| *B01J 23/00* | (2006.01) |
| *B01J 23/755* | (2006.01) |
| *B01J 23/825* | (2006.01) |
| *B01J 23/83* | (2006.01) |
| *B01J 23/86* | (2006.01) |
| *B01J 23/885* | (2006.01) |
| *B01J 23/89* | (2006.01) |
| *B01J 37/02* | (2006.01) |
| *B01J 37/03* | (2006.01) |
| *B01J 37/18* | (2006.01) |
| *C10G 3/00* | (2006.01) |
| *C10L 1/02* | (2006.01) |
| *B01J 23/887* | (2006.01) |
| *B01J 21/04* | (2006.01) |
| *B01J 21/06* | (2006.01) |
| *B01J 21/08* | (2006.01) |
| *B01J 35/10* | (2006.01) |

(52) U.S. Cl.
CPC ............... *B01J 23/83* (2013.01); *B01J 23/868* (2013.01); *B01J 23/885* (2013.01); *B01J 23/8874* (2013.01); *B01J 23/892* (2013.01); *B01J 23/898* (2013.01); *B01J 23/8926* (2013.01); *B01J 23/8986* (2013.01); *B01J 23/8993* (2013.01); *B01J 37/0201* (2013.01); *B01J 37/031* (2013.01); *B01J 37/18* (2013.01); *C10G 3/45* (2013.01); *C10G 3/46* (2013.01); *C10G 3/48* (2013.01); *C10G 3/50* (2013.01); *C10L 1/02* (2013.01); *B01J 21/04* (2013.01); *B01J 21/063* (2013.01); *B01J 21/066* (2013.01); *B01J 21/08* (2013.01); *B01J 35/1014* (2013.01); *B01J 35/1019* (2013.01); *B01J 2523/00* (2013.01); *C10G 2300/1014* (2013.01); *C10G 2300/4006* (2013.01); *C10G 2300/4012* (2013.01); *Y02E 50/13* (2013.01); *Y02E 50/14* (2013.01); *Y02E 50/32* (2013.01); *Y02P 30/20* (2015.11)

(56) References Cited

U.S. PATENT DOCUMENTS

| | | | | |
|---|---|---|---|---|
| 7,754,931 | B2* | 7/2010 | Monnier | C10G 3/46 208/15 |
| 8,158,842 | B2* | 4/2012 | McCall | C10G 45/02 518/726 |
| 8,366,910 | B2* | 2/2013 | Roberto Gomes | C10G 3/46 208/15 |
| 2008/0161614 | A1* | 7/2008 | Bertoncini | C10G 45/08 585/240 |
| 2009/0253948 | A1* | 10/2009 | McCall | C10G 3/46 585/240 |
| 2010/0170147 | A1 | 7/2010 | Mcneff et al. | |
| 2010/0270207 | A1* | 10/2010 | Gomes | C10G 45/04 208/49 |

OTHER PUBLICATIONS

Huber et al. "Synthesis of transportation fuels from biomass," Chemical Reviews; 106(9):4044-4098(2006).

Maggi et al. "Characterization and upgrading of bio-oils produced by rapid thermal processing," BioMass and Bioenergy,7(1-6):6:245-249(1994).

Zhang et al. "Review of biomass pyrolysis oil properties and upgrading research,"Elsevier, 48(1)0196-8904(2007).

* cited by examiner (A)

(B)

PROCESS FOR THE HYDROTREATMENT OF VEGETAL MATERIALS

The present invention relates to a process for the hydrotreatment of a vegetal biomass. Further, the present invention relates to a metal oxide, mixed metal oxide or metal-metalloid oxide catalyst. Furthermore, the present invention relates to the use of the catalyst.

Being the only sustainable product containing carbon, biomass is the only alternative for fossil derived crude oil derivatives. Research on the use of biomass, particularly from vegetal, or vegetable, sources, for first generation biofuels is rapidly expanding (e.g. bio-ethanol from sugar sources and starches and bio-diesel from pure plant oils). Biomass, in particular the one consisting of ligno-cellulosic materials, is difficult to convert into transportation fuels. Conventional refinery scales (up to 100 t/h crude oil equivalence) are preferable for economic reason, but problematic for biomass resources, as they are scattered and collection is difficult. In addition, various types of biomass are very different in structure and composition (accordingly the handling procedures have continuously to be adapted), have a low energy density compared to many fossil resources, and often contain significant amounts of water and ash.

Such disadvantages that may originate from some unstable components of the biomass, can be overcome if the biomass is first de-centrally restructured, densified at a smaller scale (say 2 to 10 t/h) while the intermediate product can be transported to a large central processing unit where it is transformed to a more stable product (at a scale of say 50 to 200 t/h). A potentially attractive technology for this purpose is fast pyrolysis. Fast pyrolysis is a process in which organic materials are heated to 450-600° C. with a short temperature/time ramp, in absence of air. The meaning of a short temperature/time ramp depends on the type of material to be fast pyrolysed. Under these conditions, organic vapors, permanent gases and charcoal are produced. The vapors are condensed to pyrolysis oil. Typically, 50-75 wt. % of the feedstock is converted into pyrolysis oil. Fast pyrolysis transforms difficult-to-handle biomass of different nature into a clean and uniform liquid, called pyrolysis oil. Pyrolysis oil (obtained by fast pyrolysis) can be used for the production of renewable/sustainable energy and chemicals. Its energy density is four to five times higher than wood, and more than tenfold for fluffy agricultural residues. This offers important logistic advantages. Pyrolysis liquids contain negligible amounts of ash, and have a volumetric energetic density 5 to 20 times higher than the original biomass.

An indicator to assess the degree of mild hydrogenation for the bio-oil (and possibly its use as a co-feed) is its tendency to produce coke, via the residue retained upon distillation, for example the 'Conradson Carbon Residue', or the 'Micron Carbon Residue Testing' (abbreviated CCR and MCRT, respectively). The CCR and the MCRT both can measured via a Standard Test Method for Conradson Carbon Residue (for example from the American National Standard Institute). Both of these carbon residues are given via a standard industrial coking test for characterizing the coke forming tendency. A similar analysis can be carried out using thermogravimetric analysis (or thermal gravimetric analysis, 'TGA'), in which a sample of material is heated up to a temperature of 900° C. under nitrogen in the absence of air while the weight of the remaining sample is continuously measured. The weight of the residue remaining is referred to as the 'TGA residue'. In general, pyrolysis-oils show CCR values around 10 to 50%, while CCR-values for Fluid Catalytic Cracking (FCC) feed generally <5 wt. %. Pure pyrolysis oils are immiscible with conventional crude oil derivatives, and cannot be processed in FCC units due to the large CCR value. Products from mild hydrotreatment (treatment with hydrogen) are reportedly to be distillable, with no significant coke formation, and co-processing in a laboratory FCC facility (designated as 'Micro Activity Testing' or MAT) with aromatic hydrocarbonaceous feedstocks is successfully demonstrated.

Several processes for upgrading the pyrolysis oil have been proposed in the literature. Examples of these processes include hydrogenation under hydrogen pressures, Catalytic Cracking and a High Pressure Thermal Treatment (HPTT). These upgrading processes for the pyrolysis oil may involve, for instance, removal of the oxygen (usually >95%), decarboxylation, viscosity reduction, sulphur removal, nitrogen removal, and the like. Existing processes include the hydrodeoxygenation of bio-oil, (HDO), in which a simultaneous hydrogenation, (hydro)deoxygenation and (hydro)cracking can take place. These processes apparently require high pressures of hydrogen, for instance, in the range of 50 bar to 350 bar and temperatures ranging from 50 up to 450° C., for the removal of oxygen from the pyrolysis oil in the form of water, CO or $CO_2$ ($CO_x$), with a long multi-step hydrodeoxygenation to achieve significant (~95%) oxygen removal, whereas significant methanation due to the presence of $CO_x$ also leads to high hydrogen consumption. These processes entail very high hydrogen consumption, which makes them uneconomical and difficult to carry out.

Pure pyrolysis oils are immiscible with conventional crude oil derivatives, and cannot be processed in FCC units due to the large CCR value. After hydrotreatment, however (up to 25 wt. % oxygen), co-processing in a small FCC (MAT) facility with aromatic hydrocarbonaceous feedstocks is successfully demonstrated, producing bio-gasoline with high RON value, meeting EU specifications. Fluid Catalytic Cracking of hydrogenated oils affects the way the oxygen is removed, viz. by decarboxylation rather than dehydration, while coke is formed together with additional water.

US2009253948 discloses a method of conversion of pyrolysis oils to hydrocarbon products, first by partial hydrotreatment over a hydrotreatment catalyst such as Nickel or Nickel/Molybdenum on a high surface area support or Pt and/or Pd dispersed on $\gamma$-$Al_2O_3$ or activated carbon, followed by separation of the partially deoxygenated oil stream to separate a hydrocarbon stream, and finally by full hydrotreating of the hydrocarbon stream in the presence of a hydrocracking catalyst. Another example includes Re-containing catalysts used for the hydrogenolysis of 6 carbon sugar, 6 carbon sugar alcohols and glycerol disclosed in U.S. Pat. No. 6,841,085. U.S. Pat. No. 7,425,657 further provides palladium-catalyzed hydrogenations of bio-oils and certain organic compounds. Using Re, Ru or Pd or any other noble metal as active material, though, renders the catalyst very expensive.

As an active metal Ni is known to have a high hydrogenation activity, and is a potential active metal for hydrotreatment. However, when using Ni alone (on $SiO_2$, $\gamma$- or $\delta$-$Al_2O_3$, or any other type of stabilizer or support at the high temperature and pressures applied here), the catalyst is not suitable to be used as a hydrogenation catalyst. There are basically two reasons: 1) the high reduction temperature required to achieve the reduced state (700° C. is required to achieve complete reduction), and 2) deactivation of the catalyst via char deposition ("coking"). Coking is a general problem found in transition catalyst, such as Fe, Co, Ni. The carbon deposition can block the nickel surface, or the pore openings, and this second case can also produce physical breakdown of the catalyst support. The morphology of the carbon has been identified as well-ordered graphitic deposits, carbon whiskers, non-oriented deposits, or various carbides. Also for this reason, Ni is often used as catalyst for formation of carbon nano-fibers and nanotubes.

A problem with the catalysts known from the conventional refinery processes, such as Nickel/Molybdenum or Cobalt/Molybdenum on alumina supports, is that they are not meant to handle high water contents, however high water content are common in pyrolysis oils. Usually catalysts applied are designated as supported catalysts, viz. limited amounts of active components are impregnated on porous support materials such as $Al_2O_3$, $SiO_2$, and alike. The method of impregnation usually is of a wet-type, in which water-soluble active components are deposit on the envisaged catalyst support. Consequently, those catalysts will decay under reaction conditions, wherein a large amount of water is present and rather high temperatures are applied. In addition, experiments also showed that due to the tendency of pyrolysis oils to form coke, porous catalysts, prepared by impregnation of active metals on a porous support material, causes part of the (initially) high internal surface area to become inaccessible for the reactant. All this may lead to quick catalyst inactivation, as the catalyst support disintegrates, leaching of active components into the water takes place, rendering the catalyst inactive and clogging catalyst pores, and/or clogging of the reactor, and/or severe char formation that will lead to pressure build-up in the reactor. A lower temperature for the hydrogenation reaction is profitable, as deactivation of the catalyst is less pronounced at lower temperatures. Hence, while some processes for upgrading the pyrolysis oil to produce hydrocarbon products have been disclosed, there is a need for catalyst as well as for process improvements for conversion of pyrolysis oils into useful (and more stable) products.

Accordingly, there is a continuous need in the prior art to provide better treatments for biomasses coming from vegetal sources which are easier to carry out and/or can be carried out in a shorter amount of time, and/or at less severe conditions (namely lower temperatures or lower pressures).

It is a goal of the present invention, amongst others, to provide an improved process and an improved catalyst for treating vegetal biomasses, which does not present these drawbacks, but renders a product that is better suited for further processing. The present invention relates to a process for the hydrotreatment of a vegetal biomass comprising: a) subjecting said vegetal biomass to a hydrotreatment in a first reactor, said hydrotreatment comprises contacting said vegetal biomass in an aqueous medium and a metal oxide, a mixed metal oxide, or a metal-metalloid oxide catalyst comprising at least 35% by weight of metal oxide, mixed metal oxide, or metal-metalloid oxide relative to the total weight of the catalyst, with hydrogen at a pressure in the range of 10 to 400 bar and at a temperature in the range of 50° C. to 300° C. until a predetermined level of the hydrotreatment of said biomass is obtained and wherein the metal oxide, a mixed metal oxide, or a metal-metalloid oxide catalyst comprises nickel, thereby providing a first hydrotreated biomass.

The treated biomass has better characteristics than the original biomass, such as, but not limited to, lower TGA-residue for the product, inhibited deactivation of the catalyst, promotion of hydrogenation reaction while suppressing repolymerisation reactions, lower carbonyl content, a lower MCRT content.

A biomass is to be understood as being a carbohydrate such as a lipid material (such as oil or fat) or such as a material containing lignitic hemicellulose and/or lignitic cellulose ('lignocellulosic materials') and can contain sugars or starch. The biomass is vegetal, or has a vegetable origin (any type of plant). The vegetal biomass of the present invention can accordingly be a triglyceride, a vegetal fats, a vegetal oil. They can also contain free fatty acids, mono- and di-glycerides, and unsaponifiable lipids. The vegetal biomass hydrotreated by the process of the present invention presents, before the hydrotreatment, a particularly unstable component that is hydrotreated in the reaction conditions of process of the present invention equal to, or below 300° C., advantageously equal to, or below 250° C. Other components of the biomass of the present invention can be treated by at least one subsequent hydrotreatment in the reaction conditions of process of the present invention equal to, or below 450° C., advantageously equal to, or below 250° C.

The aqueous medium is to be understood as any suitable aqueous medium (such as, but not limited by, distilled water, de-ionised water, de-gassed water). The aqueous medium can be any water content and may be at least partly provided by the vegetal biomass.

In the process according to the present invention, the catalyst used is a metal oxide, a mixed metal oxide, or a metal-metalloid oxide catalyst comprising at least 35% by weight of metal oxide, mixed metal oxide, or metal-metalloid oxide relative to the total weight of the catalyst. The term "at least 35% by weight of metal oxide, mixed metal oxide, or metal-metalloid oxide relative to the total weight of the catalyst" designates in the context of the present invention any values above 35% by weight of metal oxide, mixed metal oxide, or metal-metalloid oxide relative to the total weight of the catalyst.

Advantageously, the catalyst comprises at least 40% by weight of metal oxide, mixed metal oxide, or metal-metalloid oxide relative to the total weight of the catalyst, more advantageously, 45% by weight of metal oxide, mixed metal oxide, or metal-metalloid oxide relative to the total weight of the catalyst, most advantageously at least 65% by weight of metal oxide, mixed metal oxide, or metal-metalloid oxide relative to the total weight of the catalyst.

Advantageously, the catalysts comprises as any value between 35% and 95% by weight of metal oxide, mixed metal oxide, or metal-metalloid oxide relative to the total weight of the catalyst, such as 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 81%, 82%, 83%, 84%, 85%, 86%, 87%, 88%, 89%, 90%, 91%, 92%, 93%, 94%, 95%. More advantageously, the catalyst comprises at most 80% by weight of metal oxide, mixed metal oxide, or metal-metalloid oxide relative to the total weight of the catalyst.

According to the present invention, the catalyst is a metal oxide, mixed metal oxide, or metal-metalloid oxide catalyst comprising nickel. A metal oxide catalyst comprises the oxide of one type of metal. In the context of the present invention, the catalyst comprising a metal oxide catalyst is a catalyst comprising nickel oxide. Accordingly, process of the present invention can be carried out by a catalyst comprising nickel oxide comprising at most 80% by weight of nickel oxide relative to the total weight of the catalyst.

According to the present invention, a mixed metal oxide catalyst is a catalyst comprising at least two different metals. In the context of the present invention, the mixed metal oxide catalyst comprises nickel. It is to be understood that the mixed metal oxide catalyst of the present invention can be a mixed metal oxide comprising at least two different metals, one of them being nickel. A metal-metalloid oxide catalyst in the context of the present invention is to be understood as a catalyst comprising the oxide of at least one metal and at least one metalloid. According to the process of the present invention, the metal-metalloid oxide catalyst comprises nickel. The mixed metal oxide or metal-metalloid oxide catalyst can be designated by the oxide of the formula: $NiM^i$, wherein $M^i$ is one or more subsequent different metals (the catalyst can also comprise three, four, five or six different metals in total). The above-mentioned formula can also be applied where one of M corresponds to a metalloid, namely boron. In this case, the catalyst is a metal-metalloid oxide (comprising nickel and boron, or additionally contain one, two, three, four or five other metals).

The catalyst used in the process of the present invention advantageously comprise an element chosen from the groups 6, 8, 9, 10, 11 and 13. Groups 6, 8, 9, 10, 11 and 13 refer to the IUPAC periodic table nomenclature to designate the elements in the respective column. When referring to an element, it is understood an element of the periodic table. According to the invention, group 6 designates the elements Cr and/or Mo and/or W, group 8 designates the elements Fe and/or Ru and/or Os. Group 9 designates the elements Co and/or Rh, and/or Ir. Group 10 designates the element Pd. Group 11 designates the element Cu. Group 13 designates the elements B and/or Al and/or Ga and/or In and/or Tl.

By the expression "a metal oxide, mixed metal oxide, or a metal-metalloid oxide catalyst comprising at least 35% by weight of metal oxide, mixed metal oxide, or metal-metalloid oxide relative to the total weight of the catalyst", it is to be understood that the total amount of metal oxide, or total amount of the oxide of all the metals, or total amount the oxide of all the metals and metalloids composing the catalyst is at least 35% by weight relative to the total weight of the catalyst.

The process of the present invention carried out using a metal oxide, mixed metal oxide, or a metal-metalloid oxide catalyst comprising at least 35% by weight of metal oxide, mixed metal oxide, or metal-metalloid oxide relative to the total weight of the catalyst comprising nickel provides an improved process for the hydrotreatment a vegetal biomass. Namely, in the context of the present invention, the drawbacks known in the prior art regarding the use of Ni are solved by the present invention by using a total amount of metal (being nickel or nickel and other metals), or a total amount of metal and metalloid that is at least 35% by weight relative to the total weight of the catalyst. An additional advantage using such catalysts is that, the extent of the, likely thermally induced, repolymerisation reactions are reduced and the hydrogenation reactions are promoted. Promoting of hydrogenation reaction instead of repolymerisation also leads to limited formation of carbon-oxides (CO and $CO_2$), consequently limiting the amount of methane formed and thus the hydrogen consumption. Finally, promoting hydrogenation over repolymerisation yields product streams, which are much less viscous than products derived from conventional catalysts such as conventional Nickel/Molybdenum catalyst on a $Al_2O_3$-support.

According to the processes of the present invention, the hydrotreatment is a treatment with hydrogen ($H_2$). It can be a hydrogenation or a hydrodeoxygenation (also designated by the abbreviation HDO). In the processes according to the present invention, the contacting between the catalyst and the biomass and/or the gaseous hydrogen can be done, for example by stirring in well-known stirred tank reactors. In the process of the present invention, the stirring can be carried out by mechanical stirring or magnetical stirring, or by passing the oil over the catalyst bed in a packed bed mode. The reactors used in the process according to the present invention can be any suitable reactor, such as an autoclave.

The gaseous hydrogen can be designated by $H_2$. It can be pure or mixed with another gas such as CO or $CO_2$ or $CH_4$, or recycle gas from the process, in which gaseous products derived from the process (CO, $CO_2$ and $CH_4$) can be concentrated. The feed of gaseous hydrogen can be for example continuous until completion of the treatment. Maintaining the gaseous hydrogen feed continuous is to be understood as keeping the feed of gaseous hydrogen in order to continuously feed the reactor with hydrogen and accordingly keep the pressure of hydrogen constant in the reactor, until the end of the treatment. The term "first reactor" is to be understood that other steps may be carried out in a second, third, fourth, or fifth reactor that is/are different than the first reactor.

The temperature of step a) is in the range of 50° C. to 300° C., such as any temperature equal to, or above 50° C., such as any temperature equal to, or below 300° C., such as equal to, or below 250° C. The pressure of step a) is in the range of 10 bar to 400 bar, such as any pressure above 10 bar, such as any pressure below 400 bar. The pressure can be such as, 10 bar, 15 bar, 20 bar, 25 bar, 50 bar, 75 bar, 100 bar, 120 bar, 140 bar, 150 bar, 160 bar, 180 bar, 200 bar, 220 bar, 240 bar, 250 bar, 260 bar, 280 bar, 300 bar, 320 bar, 340 bar, 350 bar, 360 bar, 380 bar, 400 bar. The predetermined level of hydrotreatment defines the completion of the hydrotreatment reaction. It is to be understood as the moment in time, wherein the desired yield of hydrogenation is achieved determined by favorable product characteristics here defined by the value for the CCR (and/or MCRT, and/or residue) below <10%, or a carbonyl content that is significantly lower than the initial carbonyl content of the untreated vegetal biomass.

The treated biomass can be obtained after the treatment of step a) by a subsequent isolation step and/or a purification step, for example by distillation, and/or by phase separation, and/or sedimentation and/or filtration and/or chromatography.

Step a) of the process of the present invention is a first hydrotreatment and may be the only step carried out in process.

According to an embodiment of the present invention, the process can further comprise:

b) subjecting the mixture of step a) to a second hydrotreatment in a second reactor and contacting the hydrotreated vegetal biomass in an aqueous medium, and the catalyst of step a), or a different catalyst, with hydrogen at the pressure range of step a) and at a temperature equal to, or higher than the temperature of step a), and in the range of 50° C. to 450° C., until a predetermined level of second hydrotreatment of said biomass is obtained, thereby providing a second hydrotreated biomass.

Accordingly, the process of the present invention may advantageously comprise a step a) and a step b). In step b) of the process according to the present invention, the pressure is at the pressure range of step a), is to be understood as being the same (identical value) pressure than step a) or a different pressure than step a) within that range. The definitions, values and limits defined in the context of pressure of step a) are also applicable in the context of the pressure of step b). The temperature range of step b) is in the range of 50° C. to 450° C., such as any temperature equal to, or above 50° C., such as any temperature equal to, or below 450° C., such as equal to, or below 400° C. Advantageously, the temperature of step b) can have any value in the range 50° C. to 400° C., such as 50° C., 55° C., 60° C., 65° C., 70° C., 75° C., 80° C., 85° C., 90° C., 95° C., 100° C., 105° C., 110° C., 115° C., 120° C., 125° C., 130° C., 135° C., 140° C., 145° C., 150° C., 155° C., 160° C., 165° C., 160° C., 165° C., 170° C., 175° C., 180° C., 185° C., 190° C., 195° C., 200° C., 205° C., 210° C., 215° C., 220° C., 225° C., 230° C., 235° C., 240° C., 245° C., 250° C., 255° C., 260° C., 265° C., 270° C., 275° C., 280° C., 285° C., 290° C., 295° C., 300° C., 305° C., 310° C., 315° C., 320° C., 325° C., 330° C., 335° C., 340° C., 345° C., 350° C., 355° C., 360° C., 365° C., 370° C., 375° C., 380° C., 385° C., 390° C., 395° C., 400° C. Advantageously, the temperature of step b) is equal to, or above the temperature of step a). The predetermined level of the second hydrotreatment carried out in step b) (step a) being a first hydrotreatment) defines the completion of the hydrotreatment reaction. It is to be understood as the moment in time, wherein the desired yield of hydrogenation is achieved determined by favorable product characteristics here defined by the value for the CCR (and/or MCRT, and/or residue) below <10%. The hydrotreatment of step b) allows further hydrotreating the biomass obtained from step a). Advantageously, the further treatment is carried out at a higher temperature than step a) and/or during a longer period of time and/or using a different catalyst.

According to the present embodiment of the present invention, the process for the hydrotreatment of a vegetal biomass comprises two hydrotreatments of the vegetal biomass, or two steps of hydrotreatment.

The catalyst used in step b) of the process according to the present invention may be the catalyst of step a) or a different catalyst. Advantageously, the catalyst of step a) is the catalyst of step b), or a different catalyst than step a) that is a metal oxide, a mixed metal oxide, or a metal-metalloid oxide catalyst comprising at least 35% by weight of metal oxide, mixed metal oxide, or metal-metalloid oxide relative to the total weight of the catalyst, wherein the catalyst comprises nickel.

According to another embodiment of the present invention, the process further comprises:

c) subjecting the mixture of step b) to a third hydrotreatment into a third reactor and contacting the hydrotreated vegetal biomass in an aqueous medium, and the catalyst of step a), or a different catalyst, in an aqueous medium, with hydrogen at the pressure range of step a) and/or step b) and at a temperature equal to, or higher than the temperature of step b) and in the range of 50° C. to 450° C., until a predetermined level of third hydrotreatment of said biomass is obtained, thereby providing a third hydrotreated biomass.

Accordingly, the process according to the present invention may more advantageously comprise steps, a), b) and c). In step c) of the process according to the present invention, the pressure is at the pressure range of step a) and/or step b), is to be understood as being the same (identical value) pressure as step a) and/or than step b) or a different pressure than step a) and/or step b) within that range. The definitions, values and limits defined in the context of pressure of step a) are also applicable in the context of the pressure of step c). The temperature range of step c) is in the range of 50° C. to 450° C. The advantages, definitions, values and limits defined for step b) are also applicable for step c). Advantageously, the temperature of step c) is equal to, or above the temperature of step b). The predetermined level of the third hydrotreatment carried out in step c) (step a) being a first hydrotreatment, step b) being the second hydrotreatment) defines the completion of the hydrotreatment reaction. It is to be understood as the moment in time, wherein the desired yield of hydrogenation is achieved determined by favorable product characteristics here defined by the value for the CCR (and/or MCRT, and/or residue) below <10%. According to the present embodiment of the present invention, the process for the hydrotreatment of a vegetal biomass comprises three hydrotreatments of the vegetal biomass, or three steps of hydrotreatment. The hydrotreatment of step c) allows further hydrotreating the biomass obtained from step b). Advantageously, the further treatment is carried out at a higher temperature than step b) and/or during a longer period of time and/or using a different catalyst.

The catalyst used in step c) of the process according to the present invention may be the catalyst of step a) or a different catalyst. Advantageously, the catalyst of step c) is the catalyst of step a), or a different catalyst than step a) that is a metal oxide, a mixed metal oxide, or a metal-metalloid oxide catalyst comprising at least 35% by weight of metal oxide, mixed metal oxide, or metal-metalloid oxide relative to the total weight of the catalyst, wherein the catalyst comprises nickel. The catalyst of step c) may be more advantageously the catalyst of step b).

According to yet another embodiment of the present invention, the process further comprises:

d) subjecting the mixture of step c) to a fourth hydrotreatment in a fourth reactor and contacting the hydrotreated vegetal biomass in an aqueous medium, and the catalyst of step a), or a different catalyst, with hydrogen at the pressure range of step a) and/or step b) and/or step c) and at a temperature equal to, or higher than the temperature of step c) and in the range of 50° C. to 450° C., until a predetermined level of fourth hydrotreatment of said biomass is obtained, thereby providing a fourth hydrotreated biomass.

Accordingly, the process according to the present invention may more advantageously comprise steps, a), b), c) and d). In step d) of the process according to the present invention, the pressure is at the pressure range of step a) and/or step b) and/or step c), is to be understood as being the same (identical value) pressure as step a) and/or than step b) and/or than step c), or a different pressure than step a) and/or step b) and/or step c) within that range. The definitions, values and limits defined in the context of pressure of step a) are also applicable in the context of the pressure of step d). The temperature range of step d) is in the range of 50° C. to 450° C. The advantages, definitions, values and limits defined for step b) are also applicable for step d). Advantageously, the temperature of step d) is equal to, or above the temperature of step c). The predetermined level of the fourth hydrotreatment carried out in step d) (step a) being a first hydrotreatment, step b) being the second hydrotreatment and step c) being the third hydrotreatment) defines the completion of the hydrotreatment reaction. It is to be understood as the moment in time, wherein the desired yield of hydrogenation is achieved determined by favorable product characteristics here defined by the value for the CCR (and/or MCRT, and/or residue) below <10%. Advantageously, the hydrotreatment of step d) allows further hydrotreating the biomass obtained from step c). The further treatment is carried out at a higher temperature than step c) and/or during a longer period of time and/or using a different catalyst.

According to the present embodiment of the present invention, the process for the hydrotreatment of a vegetal biomass comprises four hydrotreatments of the vegetal biomass, or four steps of hydrotreatment.

The catalyst used in step d) of the process according to the present invention may be the catalyst of step a) or a different catalyst. Advantageously, the catalyst of step d) is the catalyst of step a), or a different catalyst than step a) that is a metal oxide, a mixed metal oxide, or a metal-metalloid oxide catalyst comprising at least 35% by weight of metal oxide, mixed metal oxide, or metal-metalloid oxide relative to the total weight of the catalyst, wherein the catalyst comprises nickel. The catalyst of step d) may be more advantageously the catalyst of step b) and of step c).

According to the present invention, step d) can be repeated one or more times, such as two times or more, three times or more, four times or more, five times or more. The repetition of step d) can be carried out in the fourth reactor or in other reactors, such as in a fifth reactor, in a sixth reactor, in a seventh reactor, in an eighth reactor, in a ninth reactor.

According to the process of the present invention, the mixed metal oxide catalyst, or metal-metalloid oxide catalyst comprises at least one other element chosen from a group 6 and/or 8 and/or 9 and/or 10 and/or 11 metal and/or at least one group 13 element. Advantageously, the mixed metal oxide catalyst, or metal-metalloid oxide catalyst comprises at least one other element chosen from a group 8 and/or 9 and/or 10 and/or 11 metal and/or at least one group 13 element.

According to the process of the present invention, the mixed metal oxide catalyst, or metal-metalloid oxide catalyst is prepared by a sol-gel process. The sol-gel process is a process that involves the use of metal alkoxides, which undergo hydrolysis and condensation polymerization reactions to give gels under relative mild temperatures. In the context of the present invention, the catalyst prepared by sol-gel process is of higher quality than if prepared by another method. The sol-gel process allows to prevent the problems volatilization, high melting temperatures, or crystallization during the preparation of the catalyst. In addition, the sol-gel approach is a high-purity process that leads to excellent homogeneity. The sol-gel process comprises solution, gelation, drying, and densification. The preparation of a silica glass begins with an appropriate alkoxide which is mixed with water and a mutual solvent to form a solution. Hydrolysis leads to the formation of silanol groups (Si—OH). These species are only intermediates. Subsequent condensation reactions produce siloxane bonds (Si—O—Si). The silica gel formed by this process leads to a rigid, interconnected three-dimensional network consisting of submicrometer pores and polymeric chains. During the drying process (at ambient pressure), the solvent liquid is removed and substantial shrinkage occurs. The resulting material is known as a xerogel. When solvent removal occurs under hypercritical (supercritical) conditions, the network does not shrink and a highly porous, low-density material known as an aerogel is produced. Heat treatment of a xerogel at elevated temperature produces viscous sintering (shrinkage of the xerogel due to a small amount of viscous flow) and effectively transforms the porous gel into a dense glass. The catalysts prepared by the sol-gel process include materials that have specific properties than if prepared by another method, such as ferroelectricity, electrochromism, or superconductivity, but also composition control, microstructure control, purity, and uniformity of the method combined with the ability to form various shapes at low temperatures.

One important reason why the catalysts described here are much more effective in hydrogenation of (pyrolysis) biomasses may be due to the sol-gel method used in its preparation. In the present invention, the catalysts are prepared by a hetero-phase sol-gel method, through impregnation of the dispersed hydrated metal oxide with commercial ethyl silicate. This method appears very effective for the preparation of high-loaded nickel-base catalysts, demonstrating that the active metal surface is not blocked by support material, and showing higher comparative activities. Guaiacol is frequently taken as a model component for bio-oil lignin, but it is rather stable compared to pure bio-oil. Deoxygenation of such phenolic components (viz. guaiacol, catechol and so on) gives indications on the activity of catalysts. According to the process of the present invention, the metal oxide, mixed metal oxide, or metal-metalloid oxide catalyst comprises at least 40% by weight of metal oxide, mixed metal oxide, or metal-metalloid oxide relative to the total weight of the catalyst. "at least 40% by weight of metal oxide, mixed metal oxide, or metal-metalloid oxide relative to the total weight of the catalyst" is to be understood as at least any value above 40% by weight, such as at least 40%, at least 45%, at least 50%, at least 55%, at least 60%, at least 65% by weight of metal oxide, mixed metal oxide, or metal-metalloid oxide relative to the total weight of the catalyst.

According to the process of the present invention, the metal oxide, mixed metal oxide, or metal-metalloid oxide catalyst comprises at most 80% by weight of nickel relative to the total weight of the catalyst. Advantageously, the metal oxide, mixed metal oxide, or metal-metalloid oxide catalyst comprises at most 75% by weight of nickel relative to the total weight of the catalyst, more advantageously at most 70% by weight of nickel relative to the total weight of the catalyst. Advantageously, the catalyst used in the process according to the present invention comprises 35% to 80% by weight of nickel relative to the total weight of the catalyst, more advantageously 45% to 80% by weight of nickel relative to the total weight of the catalyst, yet more advantageously 45% to 75% by weight of nickel relative to the total weight of the catalyst, most advantageously 65% to 75% by weight of nickel relative to the total weight of the catalyst, yet most advantageously 65% to 75% by weight of nickel relative to the total weight of the catalyst.

According to the process of the present invention, the mixed metal oxide or metal-metalloid oxide catalyst comprises nickel and at least one element chosen from the group Mo, W, Fe, Co, Pd, Cu, B, Al, Ga, In, Tl. The catalyst can be represented by the oxide of the elements with the general formula:

$$Ni_nM_{1-n}$$

wherein M at least one of the element chosen from the group Mo, W, Fe, Co, Pd, Cu, B, Al, Ga, In, Tl and 0.01<n<0.99. M can be more than one element, such as two elements, three elements, four elements, five elements of the periodic table.

According to the present invention, the mixed metal oxide catalyst, or metal-metalloid oxide catalyst comprises nickel and copper and/or cobalt. Advantageously, the catalyst comprises no other elements or another element selected from the group Fe, Pd, B, Ga, In, Tl.

According to the process of the present invention, the catalyst comprises a stabilizing agent. The stabilizing agent can be any known stabilizing agents for catalysts. It may also contain a promoter.

According to the process of the present invention, the catalyst comprise a stabilizing agent in amount of at most 35% by weight, such as 1%, 2%, 3%, 4%, 5%, 6%, 8%, 9%, 10%, 12%, 14%, 15%, 16%, 17%, 18%, 20%, 22%, 24%, 25%, 26%, 28%, 30%, 31%, 32%, 33%, 34%, 35% by weight of the catalyst. Advantageously, the catalyst comprises a stabilizing agent in amount of at most 30% by weight, more advantageously at most 25% by weight of the catalyst.

According to the present invention, the catalyst comprise a stabilizing agent chosen from the group $Al_2O_3$, $SiO_2$, $ZrO_2$, $CeO_2$, $TiO_2$, $Cr_2O_3$, $MoO_2$, $WO_2$, $V_2O_5$, $MnO_2$, $La_2O_3$ and a mixture thereof. Advantageously, the stabilizing agent comprises a mixture of two or three stabilizing agents with a total at most 35% by weight of the catalyst.

According to process of the present invention, the original biomass is pretreated, before carrying out the process of the present invention, at a temperature ranging 200° C. to 800° C., preferably 300° C. to 700° C., more preferably 450° C. to 650° C., such as below 650° C., such as above 450° C., in absence of air. This is also designated as pretreatment. This pretreatment is also designated as pyrolysis. It can be a fast pyrolysis. The resulting product (pretreated vegetal biomass) is also designated as pyrolysis oil.

According to a preferred embodiment of the present invention, the vegetal biomass is derived from a material containing lignitic and/or hemi-cellulosic and/or cellulosic materials.

According to another preferred embodiment, the temperature in step a) is a temperature in the range of 50° C. to 250° C., such as 50° C., 55° C., 60° C., 65° C., 70° C., 75° C., 80° C., 85° C., 90° C., 95° C., 100° C., 105° C., 110° C., 115° C., 120° C., 125° C., 130° C., 135° C., 140° C., 145° C., 150° C., 155° C., 160° C., 165° C., 160° C., 165° C., 170° C., 175° C., 180° C., 185° C., 190° C., 195° C., 200° C., 205° C., 210° C., 215° C., 220° C., 225° C., 230° C., 235° C., 240° C., 245° C., 250° C. Advantageously, the temperature in step a) is in the range 80° C. to 250° C.

According to yet another preferred embodiment, the temperature in step b), c) and d) is in the range 50° C. to 350° C., such as 50° C., 55° C., 60° C., 65° C., 70° C., 75° C., 80° C., 85°C., 90° C., 95° C., 100° C., 105° C., 110° C., 115° C., 120° C., 125° C., 130° C., 135° C., 140° C., 145° C., 150° C., 155° C., 160° C., 165° C., 160° C., 165° C., 170° C., 175° C., 180° C., 185° C., 190° C., 195° C., 200° C., 205° C., 210° C., 215° C., 220° C., 225° C., 230° C., 235° C., 240° C., 245° C., 250° C., 255° C., 260° C., 265° C., 270° C., 275° C., 280° C., 285° C., 290° C., 295° C., 300° C., 305° C., 310° C., 315° C., 320° C., 325° C., 330° C., 335° C., 340° C., 345° C., 350° C. Advantageously, the temperature in step b) and c) is lower than the temperature in step d). More advantageously, the temperature in step b) is in the range 50° C. to 300° C., more advantageously 80° C. to 250° C. The temperature in step a) may be equal to, or below the temperature in steps b), c), d). The temperature in step b) may be equal to, or below the temperature in steps c) and d). The temperature in step c) may be equal to, or below the temperature in step d).

According to still another preferred embodiment of the present invention, the pressure of the process is a pressure in the range of 10 bar to 350 bar, such as 10 bar, 15 bar, 20 bar, 25 bar, 30 bar, 35 bar, 40 bar, 45 bar, 50 bar, 55 bar, 60 bar, 65 bar, 70 bar, 75 bar, 80 bar, 85 bar, 90 bar, 95 bar, 100 bar, 105 bar, 110 bar, 120 bar, 125 bar, 130 bar, 140 bar, 150 bar, 160 bar, 170 bar, 180 bar, 190 bar, 200 bar, 210 bar, 220 bar, 230 bar, 240 bar, 250 bar, 260 bar, 270 bar, 280 bar, 290 bar, 300 bar, 310 bar, 320 bar, 330 bar, 340 bar, 350 bar.

According to another aspect of the present invention, the invention relates to a catalyst obtainable by a process comprising:
1) mixing hydrated metal oxides a $NH_3$ aqueous solution
2) adding a solution of a $C_1$-$C_6$ alkyl silicate in a $C_1$ to $C_6$-alkyl alcohol;
3) impregnating with $ZrO(NO_3)_2 \cdot 2H_2O$ and $La(NO_3)_3 \cdot 6H_2O$ in water;
4) drying the obtained product; and
5) calcining the product obtained in 4) at a temperature in the range 350° C. to 900° C.

The catalyst obtainable by the process according this aspect of the present invention is a catalyst obtainable by a sol-gel process. The aqueous $NH_3$ (ammonia) aqueous solution may be any aqueous solution of ammonia. $C_1$-$C_6$ alkyl silicates are silicates with a rest alkyl comprising 1 to 6 carbon atoms. The carbon silicate is advantageously, ethyl silicate, but other hydrocarbon rests such as methyl propyl, or butyl silicates (or a mixture thereof) also give good results. The $C_1$-$C_6$ alkyl alcohol can be any of the alcohols chosen from the group methanol, ethanol, n-propanol, isopropanol, n-butanol, isobutanol, t-butanol, any pentanol, any hexanol (or a mixture thereof). The catalyst according to the present aspect of the present invention is accordingly prepared with a stabilizing agent of $ZrO_2/La_2O_3$. The calcination temperature can advantageously be in the range 350° C. to 900° C., more advantageously 350° C. to 750° C., most advantageously 350° C. to 500° C.

According to another aspect, the present invention relates to a catalyst. The catalyst of the present invention comprises the oxide of nickel and at least one other element chosen from a group 6 and/or 8 and/or 9 and/or 10 and/or 11 metal and/or at least one group 13 element with the general formula:

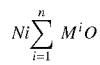

wherein $M_i$ is the element different from Ni, n is $1 \leq n \leq 5$, and wherein the atomic ratio

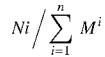

is in the range 0.01 to 99, preferably from 5 to 99, more preferably 9 to 99, and wherein the total weight of metal, metals or metal-metalloid is at least 35% by weight of metal oxide, mixed metal oxide, or metal-metalloid oxide relative to the total weight of the catalyst.

The general formula

can also be designated by $Ni_nM_{1-n}$ wherein M is at least one of the element chosen from the group Mo, W, Fe, Co, Pd, Cu, B, Al, Ga, In, Tl and $0.01 < n < 0.99$. M can be more than one element, such as two elements, three elements, four elements, five elements of the periodic table. With two elements or more, the formula can be $Ni_n(M^1M^2)_{1-n}$, or $Ni_n(M^1M^2M^3)_{1-n}$, or $Ni_n(M^1M^2M^3M^4)_{1-n}$, or $Ni_n(M^1M^2M^3M^4M^5)_{1-n}$.

According to the present invention, the catalyst comprises nickel and at least two other elements chosen from a group 6 and/or 8 and/or 9 and/or 10 and/or 11 metal and/or at least one group 13 element, with the general formula:

wherein $M^1$ is the element different from Ni, n is $1 \leq n \leq 5$, and wherein the atomic ratio

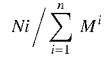

is in the range 0.01 to 99, preferably from 5 to 99, more preferably 9 to 99, and wherein the total weight of metal, metals or metal-metalloid is at least 35% by weight of metal oxide, mixed metal oxide, or metal-metalloid oxide relative to the total weight of the catalyst.

According to the present invention, the catalyst comprises at least one or two other element(s) is/are chosen from the group Mo, W, Fe, Co, Pd, Cu, B, Al, Ga, In, Tl.

According to the present invention, the catalyst mixed metal oxide or metal-metalloid oxide catalyst is chosen from an oxide of the group NiCu, PdNi, NiB, NiMo, NiW, NiCuFe, NiCuGa, NiCuTl, PdNiCu, NiCuB, NiCuCo, NiCoFe, NiMoW, NiCuCoFe, NiFeInGa.

Mixed metal oxide or metal-metalloid oxide catalyst comprises a stabilizing agent in amount of not more than 35% by mass of the catalyst and is chosen from the group $Al_2O_3$, $SiO_2$, $ZrO_2$, $CeO_2$, $TiO_2$, $Cr_2O_3$, $MoO_2$, $WO_2$, $V_2O_5$, $MnO_2$, $La_2O_3$, and a mixture thereof.

When the catalyst according to the present invention is used for treatment of vegetal biomasses in the presence hydrogen it provides a better treatment of the vegetal biomass because it prevents the polymerization of said biomass and causes less methanation (also designated as production of methane) during the treatment, resulting in obtaining a treated vegetal biomass product of higher quality.

According to yet another aspect of the present invention, the catalyst is used for hydrogenation or hydrodeoxygenation. A hydrogenation is a treatment with hydrogen. A hydrodeoxygenation (HDO) is a treatment with hydrogen comprising the removal of oxygenated compounds from the treated products.

According to the present invention, catalyst is used for the hydrogenation or hydrodeoxygenation of organic materials. Organic materials are materials of any origin and can be hydrocarbons, hydrocarbons with heteroatoms such as, but not limited to, N, O, S, F, Cl, Br.

According to the present invention, catalyst is used for the hydrogenation or hydrodeoxygenation of pyrolysed organic materials.

According to the present invention, catalyst is used for the preparation of biofuels. Biofuels are a wide range of energy source derived from biomass. The term designates solid or liquid fuels (e.g. bioethanol, biodiesel) and various biogases. Bioethanol is an alcohol made by fermenting the sugar components of plant materials and it is made mostly from sugar and starch crops. With advanced technology being developed, cellulosic biomass, such as trees and grasses, are also used as feedstocks for ethanol production. Biodiesel is made from vegetal oils, animal fats or recycled greases. Biodiesel can be used as a fuel for vehicles in its pure form, but it is usually used as a diesel additive to reduce levels of particulates, carbon monoxide, and hydrocarbons from diesel-powered vehicles.

The present invention is further described, without being limited, by the following figures and Examples.

FIGURES BRIEF DESCRIPTION OF THE DRAWINGS

Figure 2:
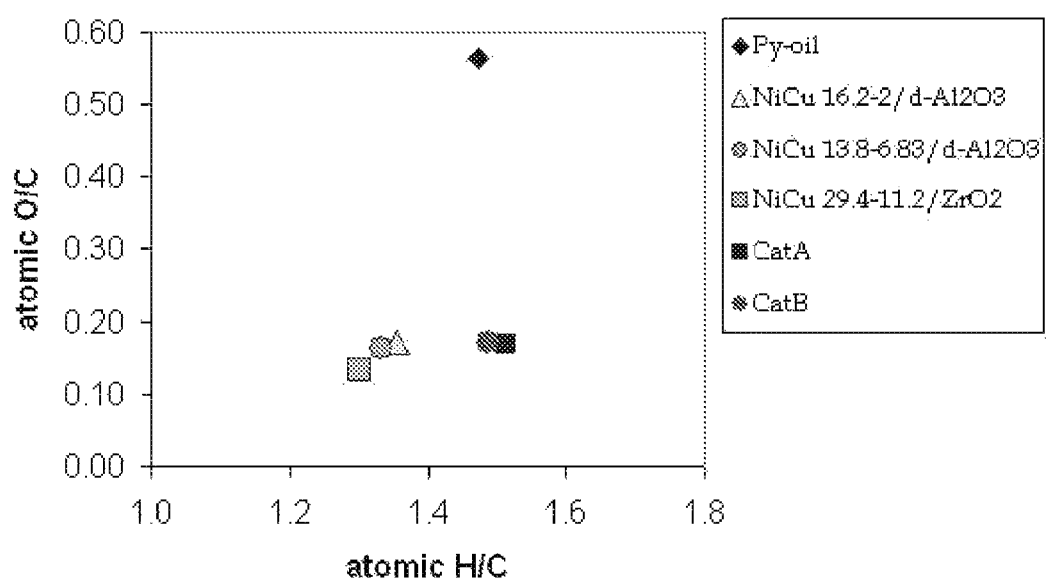

FIG. 1. vegetal biomass after the treatment according to the invention using supported and unsupported catalysts FIG. 2. Van Krevelen plot for various catalysts FIG. 3. Conradson Carbon Residue (wt %) versus $H_2$ consumption FIG. 4. (A) residue (wt %) for catalyst Ru/C and the catalyst NiCu; (B) average molecular weight of final product (treated biomass)

Figure 5:
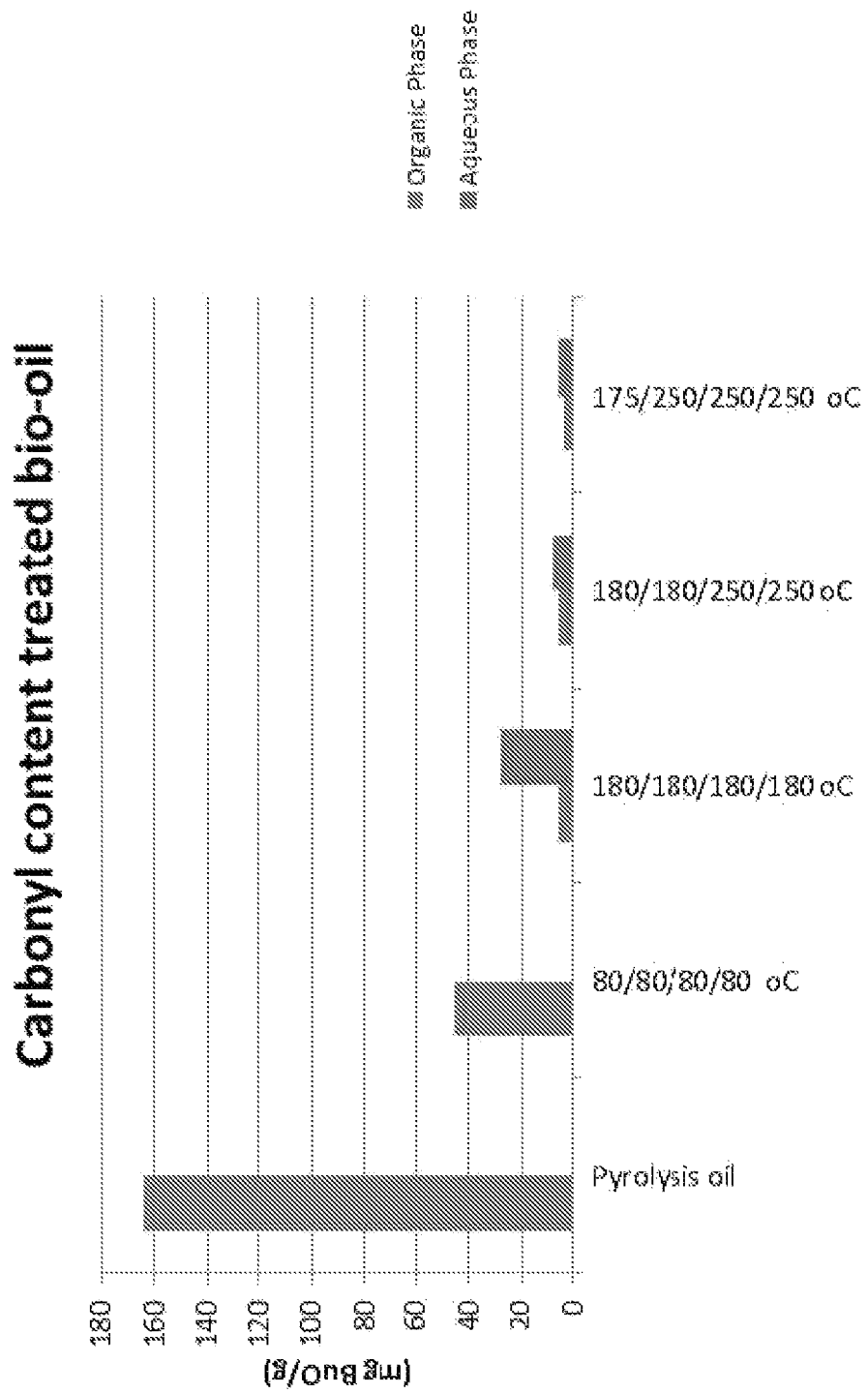

FIG. 5. The carbonyl content in mg BuO/g of pure bio-oil and oils vs. the treatment at different temperatures. The values on the x-axis represent the temperatures of the four individual segments of the reactor. The bars represent the oily and aqueous fraction respectively, obtained after treatment. In case the temperatures <180° C. only one-single phase oil is obtained, and the oil is taken as such.

Figure 6:
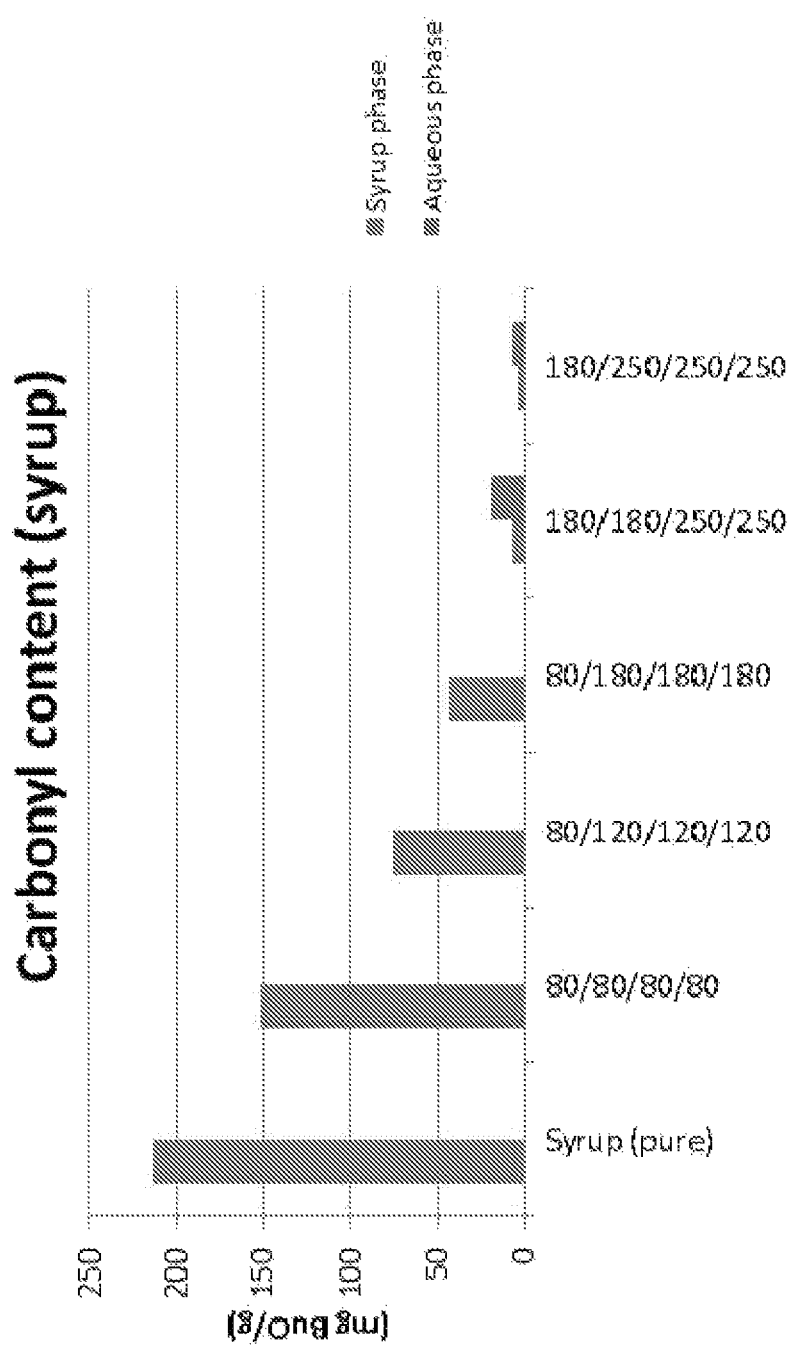

FIG. 6 The carbonyl content in mg BuO/g of the syrup fraction and the oils after treatment at different temperatures. The values on the x-axis represent the temperatures of the four individual segments of the reactor. The bars represent the oily and aqueous fraction respectively, obtained after treatment. In case the temperatures <180° C. only one-single phase oil is obtained, and the oil is taken as such.

Figure 7:
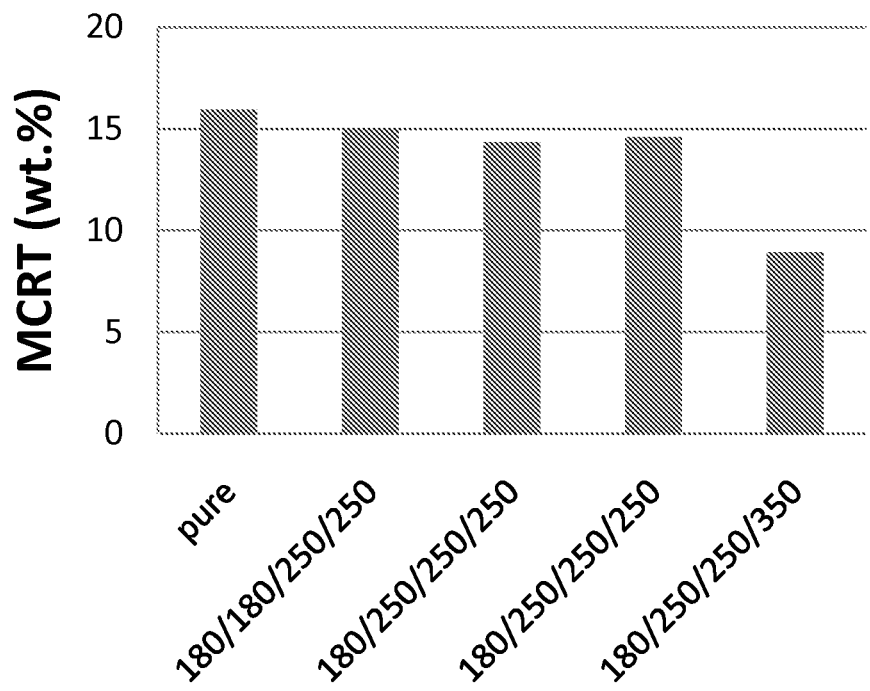

FIG. 7 The MCRT value for the lignitic fraction and the oils vs. treatments at different temperatures. The values on the x-axis represent the temperatures of the four individual segments of the reactor.

Figure 8:
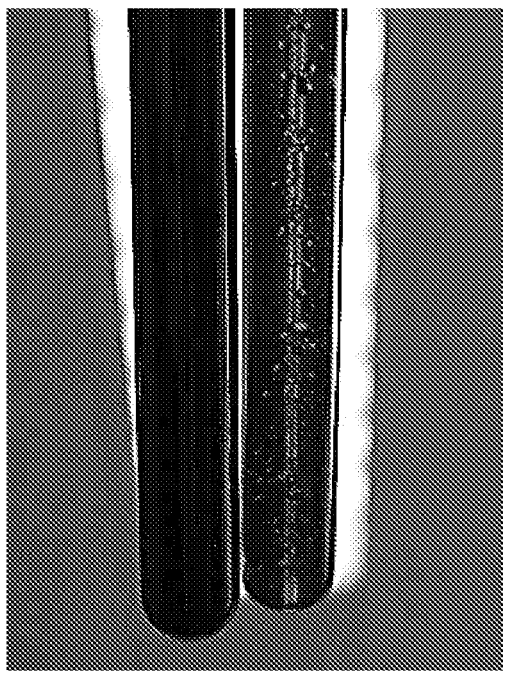

FIG. 8 Photograph of the oil obtained after treatment over commercial catalyst such as Ru/C, CoMo/$Al_2O_3$, NiMo/$Al_2O_3$ with a metal content in lower than 35 wt. % relative to the total weight of the catalyst. This photograph is taken for oil obtained over a Ru/C catalyst (left: Sigma-Aldrich 5 wt % of Ru, $S_{BET}$ of >700 m$^2$/g, surface weighted mean diameter around 10 μm) and an oil derived over catalyst used in example 34 (right). Conditions: 350° C. for 4 h, at 85 bar initial $H_2$ pressure at room temperature.

Figure 9:
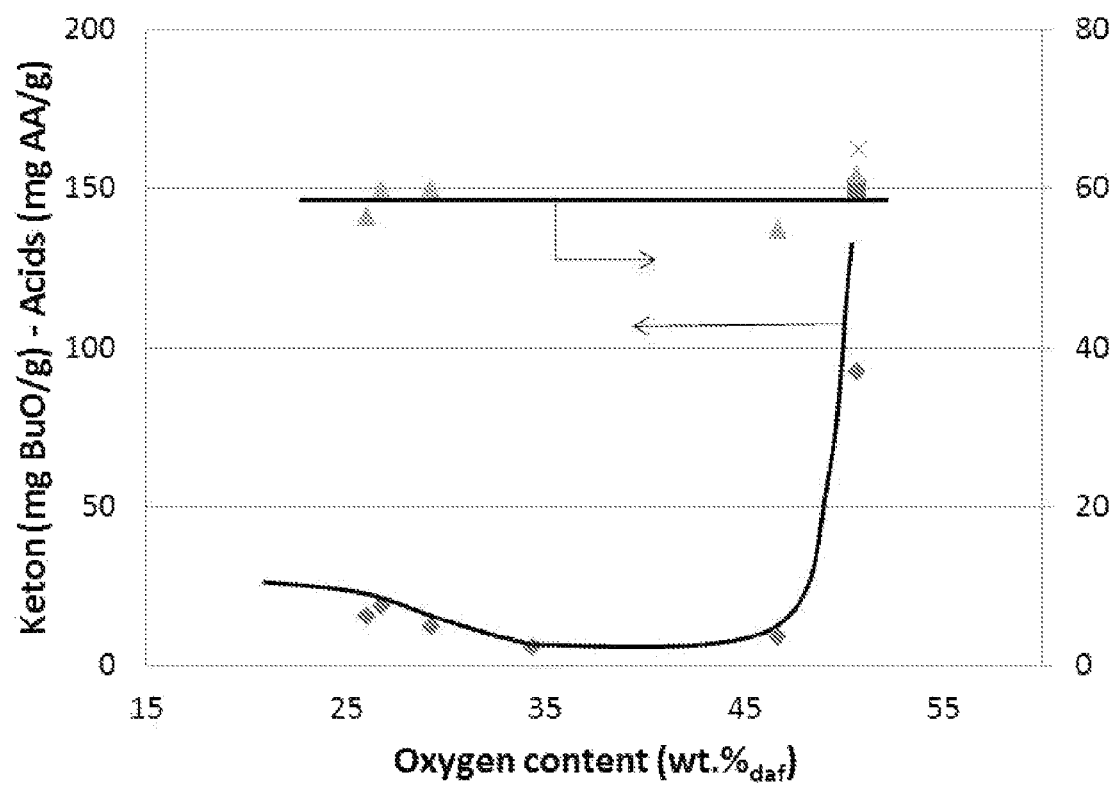

FIG. 9 The effect of deoxygenation on the acidity of the produced organic oil phase (right y-axis) and on the amount of carbonyl groups in the oils (left axis).

Figure 10:
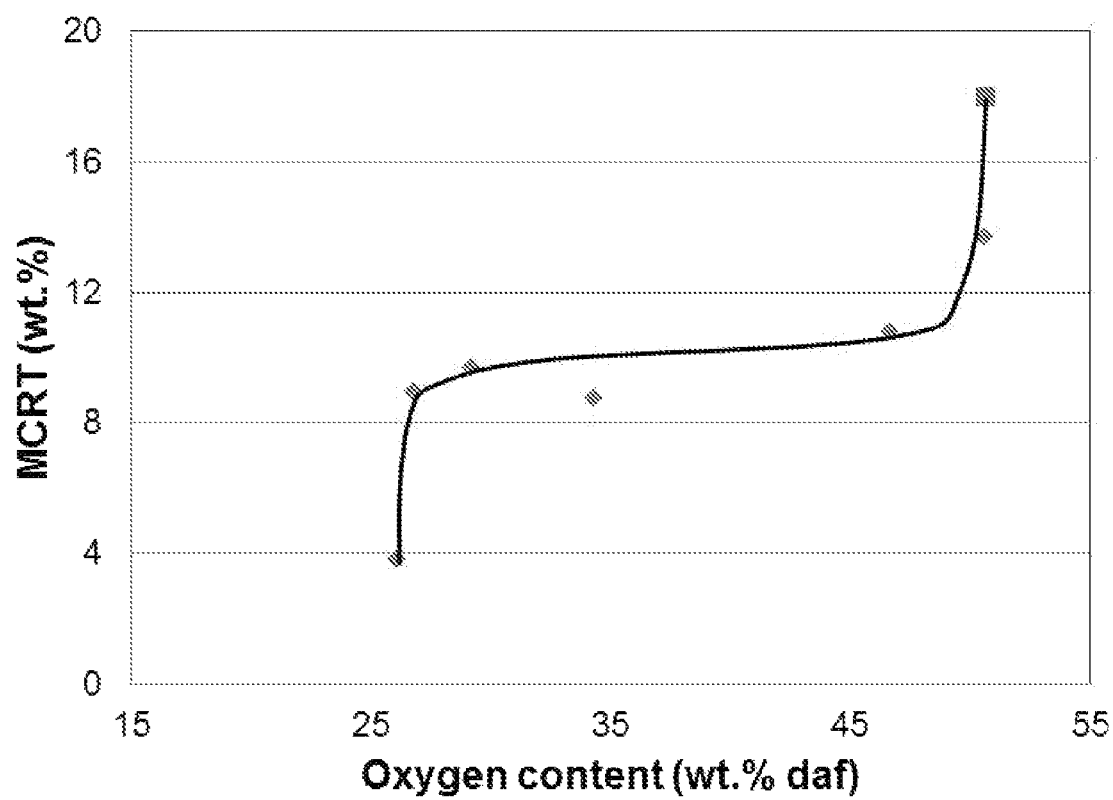

FIG. 10 The coking tendency as described by the MCRT values (ASTM D 4530) versus the remaining oxygen content in the organic phase of the hydrotreated bio-oil.

EXAMPLES

Example 1

1 kg of commercial $NiCO_3 \cdot mNi(OH)_2 \cdot nH_2O$, 0.13 kg of $CuCO_3 \cdot mCu(OH)_2$ and 0.313 l of a 25% $NH_3$ solution were added to 1.25 l of water and stirred for 4 h. Subsequently a 1.5 kg of solution, containing 0.66 kg of ethyl silicate in ethyl alcohol was added to the suspension and the obtained solution was stirred for 4 h. Then, during stirring, the solution was heated to 80° C. until a viscous mixture was formed. This mixture was dried at 120° C. for 4 h during which a light-green solid was obtained. Next, the resulting catalyst is calcined, while increasing the temperature from room temperature to 400° C. with the heating rate of 5° C./min, and keeping it at 400° C. for a further 2 h. After that the material is cooled down to the room temperature, leaving approx. 0.9 kg solid material. Finally the catalyst is pressed into tablets, with size 10×4 mm. The pressure applied was approx. 3000 kg for each tablet.

The packed bed was filled with approx. 150 gram of this crushed unsupported catalyst, after being conditioned for another 4 hours at 650° C. under air. The bed of catalyst was firstly activated by passing hydrogen over the bed for 2 h, at pressures up to 5 bar, and temperatures of 350° C. Hydrogen (5.0 quality) was obtained from Indugas.

Example 2

A vegetal biomass, also designated as fast pyrolysis oil (e.g. a wood oil, such as pine oil or palm oil), was hydrotreated in a 100-mL batch autoclave setup (Buchi AG), with a maximum pressure and temperature of 350 bar and 450° C., respectively. The temperature of the system was controlled using an electric heating mantle combined with a cooling spiral using water. The reactor content was stirred at 1300 rpm with a magnetically driven gas-inducing impeller. The impeller was of the Rushton type with four blades (diameter=24 mm, height=12 mm, and thickness=5.5 mm). Temperature and pressure in the reactor vessel were measured and monitored by a PC. The reactor was filled with fast pyrolysis oil (25 g) and the catalyst described in Example 1 (1.25 g, 5 wt % on the basis of wet pyrolysis oil). Subsequently, the reactor was flushed with nitrogen gas and pressurized with 20 bar of hydrogen at room temperature. The reactor was heated to the intended reaction temperature (250 or 350° C.) at a heating rate of 16° C./min and kept at that temperature for the intended reaction time. The hydrogen pressure in the reactor was set to the predetermined value. The pressure during a run was kept constant by continuous feeding of hydrogen. After completion of the reaction, typically 4 h, the reactor was cooled to ambient temperature. The pressure was recorded for mass balance calculations, and the gas phase was sampled intermittently. The liquid product, consisting of a water phase and, depending on the catalyst and reaction temperature, one or two organic phases, was recovered the reactor using a syringe, and the liquid product was weighed. Subsequently, the reactor was rinsed with acetone. The combined acetone fractions with suspended solids were filtered. After filtration, the filter was dried and weighed. The amount of solids minus the original catalyst intake was taken as the amount of solids formed during the hydrodeoxygenation (HDO) process.

Example 3

Experiments using a commercial available catalyst (Ru/C) and catalysts derived from the method described in example 1 (PdNi and NiCu) are reported in the figures. FIG. 1 shows the vegetal biomass after hydrogenation, showing that the biomass at the bottom of the sample volume, with water floating on the top. Surprisingly, the biomass treated with unsupported catalyst (reference cat A and cat B which correspond to PdNi and NiCu respectively) is already much more clearer than those derived from supported catalysts, indicating that much more hydrogenation occurred than repolymerisation. In addition, TGA values of the samples derived from PdNi or NiCu at these severe conditions are <1 wt. % in comparison with values of >5 wt. % for the Ru/C catalyst. Both of the biomasses treated with supported and of unsupported catalysts are higher in density than water. The hydrogenation of the oil is thus much better, which is also elucidated in FIG. 2, where in a well-known Van Krevelen plot (O/C versus H/C), it is shown that, at a similar oxygen content, the ratio of H/C is higher for the unsupported catalyst.

Figure 3:
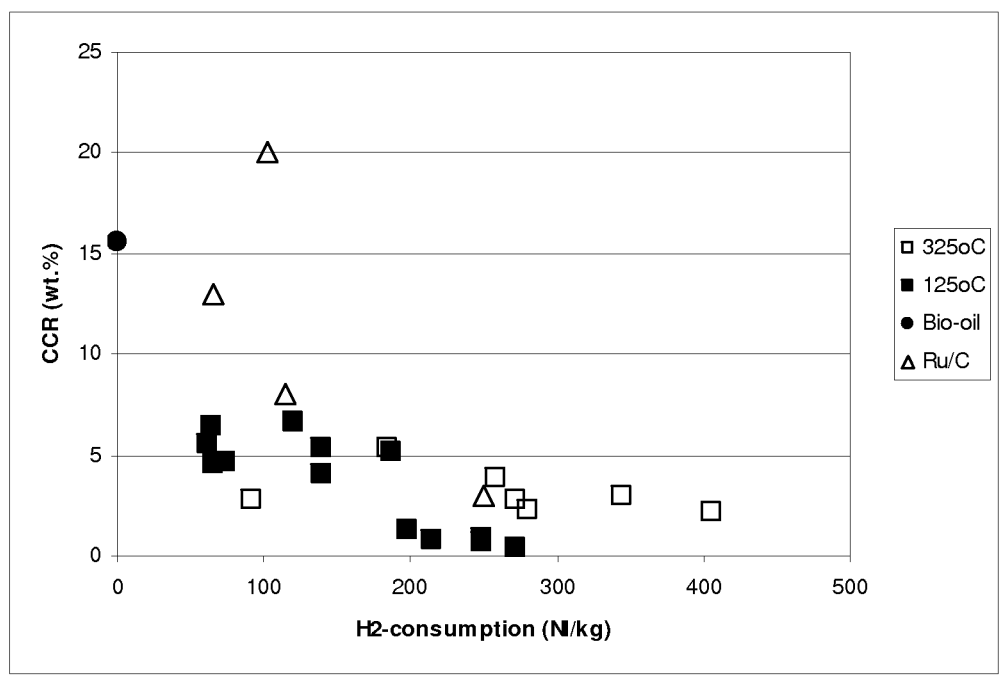
Figure 4:
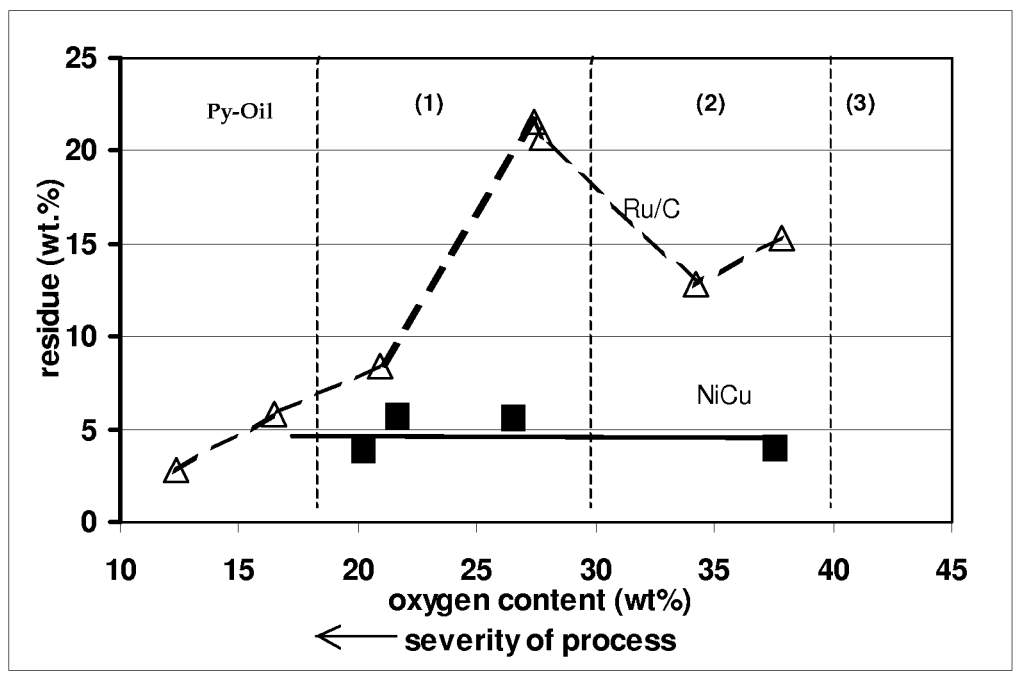
Figure 4:
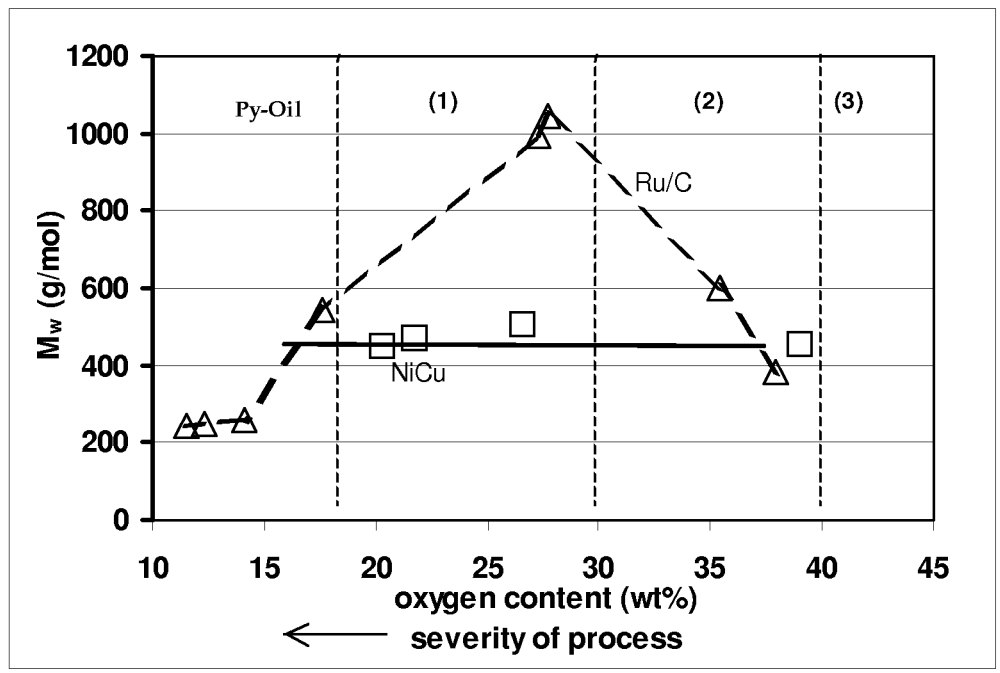

Results show that hydrogenation rates are higher when using the process according to the invention. Additionally, repolymerisation is limited compared to Ru/C (see FIG. 2). Results show that residue tests using a thermogravimetric analysis technique show carbon residues of around 1%. FIG. 3 shows the value for the TGA residue versus the remaining oxygen content in the treated oil. It is observed that less residue is formed and the hydrogenation rate with the catalysts according to the present invention (■ at 125° C. and □ 350° C., respectively) is higher than for Ru/C catalyst. FIG. 4 shows the comparison for unsupported catalyst NiCu and Ru/C. FIG. 4(A) shows the TGA residue after distillation of the final product (treated biomass) with the catalyst Ru/C and the catalyst according to the invention (NiCu). FIG. 4 (B) shows the average molecular weight of the final product (treated biomass), determined by Gel Permeation Chromatography (GPC). Both, the TGA residue and the molecular weight, are plotted as a function of the remaining oxygen content of the treated vegetal biomass. The treated biomass has a oxygen content varying from almost 10 to up to 40%. In this range for the oxygen content the TGA residue shows a sharp increase in case of Ru/C as catalyst, while in the present invention a constant TGA residue value of around 5% is measured. Surprisingly, and not expected on basis of test carried out using other catalysts, already at less severe operating conditions, such as the low temperatures of 125° C. and lower where the decay in the catalyst and/or support is much less than at the higher temperatures, a significant reduction in the value for the TGA residue can already be achieved.

Also the molecular weight in case of Ru/C shows a significant increase from 400 up to 1000 Da in case of Ru/C as catalyst, but a constant value over the oxygen content interval of 400-450 Da. It can be concluded from FIG. 4 that treating the biomass over Ru/C leads to significant polymerization next to hydrogenation, while the reaction using the process according to the present invention do not show such a polymerization, indicating that for this unsupported catalyst hydrogenation of the vegetal biomass is the prominent reaction mechanism. FIG. 4 (A) shows a constant value for the residue almost independent of the oxygen content arrived at for the treated material, well below 10 wt % of the total product weight. In comparison with Ru/C, a lower molecular weight of the plant oil can be observed in FIG. 4 (B) when the hydrogenation is carried out with the NiCu catalyst according to the process according to the invention.

Example 4

For the preparation of NiFeCu/SiO$_2$ catalyst, the appropriate amounts of commercial NiCO$_3$.mNi(OH)$_2$.nH$_2$O, CuCO$_3$.mCu(OH)$_2$, Fe(SO$_4$)$_2$.7H$_2$O and 25% NH$_3$ solution were dissolved in water and stirred for 4 h. Subsequently a solution of ethyl silicate in ethyl alcohol was added to the suspension and the obtained solution was stirred for 4 h. Then, during stirring, the solution was heated to 80° C. until a viscous mixture was formed. This mixture was dried at 120° C. for 4 h during which a solid was obtained. Next, the resulting catalyst is calcined, while increasing the temperature from room temperature to 400° C. with the heating rate of 5° C./min, and keeping it at 400° C. for a further 2 h. After that the material is cooled down to the room temperature. Finally the catalyst is pressed into tablets, with size 10×4 mm. The pressure applied was approx 3000 kg for each tablet, yielding the unsupported catalyst being referred to in the latter examples. Then the catalyst was activated by reduction in Ar and H$_2$ mixture (Ar:H$_2$=1:1 vol.) at pressures up to 5 bar, and temperatures of 300° C. The catalyst in the amount of 1 g was tested in the batch reactor at a hydrogen pressure of 170 bar, temperature 320° C. and a reagent/catalyst ratio=33 g/g in the hydrodeoxygenation (HDO) of guaiacol (or 2-methoxyphenol, compound, also designated by the formula C$_6$H$_4$(OH)(OCH$_3$) and derived from guaiacum or wood creosote).

The gas analyses (H$_2$, CO, CO$_2$, CH$_4$) were carried out using a Hromos GH-1000 GC equipped with a packed columns ('Silohrom' and activated carbon). The liquid products were analysed using a Hromos GH-1000 GC equipped with a capillary column (Zebron ZB-1, stationary phase 100% dimethylpolysiloxane, 0.25 μm×30 m) and a FID and by GC-MS using "Saturn" (Varian) equipped with the ion trap and capillary column HP-5 (stationary phase 5% phenyl–95% dimethylpolysiloxane, 0.25 μm×30 m).

Examples 5-13

Catalysts prepared by the same way than in Example 4 were tested in guaiacol HDO in the same conditions. Data on the composition, activity and selectivity of catalysts after 60 min. of the reaction, as well as their specific surface areas (BET) are given in Table 1.

TABLE 1

| Example | Sample* | $S_{BET}$, m²/g | Conversion, % | HDO, % |
|---|---|---|---|---|
| 4 | 60% Ni 5% Fe 5% Cu/ 30% SiO₂ | 110 | 95 | 90 |
| 5 | 68% Ni 1% Ga 1% Cu/ 30% SiO₂ | 216 | 97 | 81 |
| 6 | 40% Ni 25% Cu 5% Tl/ 30% Cr₂O₃ | 70 | 70 | 4 |
| 7 | 60% Ni 10% Fe 5% Co 5% Cu/ 20% SiO₂ | 40 | 97 | 4 |
| 8 | 50% Ni 10% Co 10% Fe/ 30% CeO₂—ZrO₂ | 80 | 94 | 34 |
| 9 | 70% Ni 10% Cu 10% Co/ 10% Al₂O₃ | 42 | 77 | 62 |
| 10 | 50% Fe 10% Ni 5% In 5% Ga 10% Cu/20% TiO₂ | 81 | 65 | 35 |
| 11 | 60% Ni 5% Cu 5% Tl/ 30% MoO₂ | 60 | 67 | 15 |
| 12 | 60% Ni 9% Cu 1% B/ 30% SiO₂ | 142 | 86 | 91 |
| 13 | 60% Ni 5% Cu 5% Fe/ 30% ZrO₂—SiO₂ | 66 | 96 | 82 |

*mass percents

The total conversion of guaiacol ($X_{GUA}$, %) and HDO degree (HDO, %) were defined as follows:

$$X_{GUA}(\%) = \frac{n^0_{GUA} - n_{GUA}}{n^0_{GUA}} \cdot 100 = X \cdot 100$$

$$HDO(\%) = \frac{n^0_{GUA} \cdot X \cdot 2 - \sum_i n_i \cdot a_i}{n^0_{GUA} \cdot X \cdot 2} \cdot 100 = \left(1 - \frac{\sum_i n_i \cdot a_i}{n^0_{GUA} \cdot X \cdot 2}\right) \cdot 100,$$

where $n_{GUA}^0$ and $n_{GUA}$—are initial and final concentrations of guaiacol in the liquid probe, $n_i$—the molar concentration of product i in the liquid probe, $a_i$—the number of O atoms in the molecule of product i in the liquid probe. The same technique was applied to analyse the other model compounds (anisole etc.).

Examples 14-18

The catalyst containing, wt. %: 60 Ni, 8 Cu, 2 Fe and 30 SiO₂ or CeO₂—ZrO₂, or CeO₂, or ZrO₂, or TiO₂, and SiO₂, prepared by the same way as described in Example 1) was reduced in a hydrogen (hydrogen flow rate 10 l/h) by raising the temperature up to 300° C. with the heating rate of 10° C./min and kept at that temperature for 2 h. The amount of hydrogen was taken in excess over the amount required for the complete reduction of the active components of the catalyst. The catalyst fraction 0.25-0.5 mm in the amount of 0.5 ml was tested in a flow fixed bed reactor at a hydrogen pressure of 10 bar, temperature of 300° C. and load of LHSV=6 h⁻¹ in anisole HDO.

Data on the composition, activity and selectivity of catalysts after 60 min. of the reaction, as well as their specific surface areas (BET) are given in Table 2.

TABLE 2

| Example | Sample | $S_{BET}$, m²/g | Conversion, % | HDO, % |
|---|---|---|---|---|
| 14 | NiCuFe/CeO₂—ZrO₂ | 70 | 36 | 87 |
| 15 | NiCuFe/CeO₂ | 74 | 38 | 67 |
| 16 | NiCuFe/ZrO₂ | 73 | 41 | 92 |
| 17 | NiCuFe/TiO₂ | 31 | 28 | 56 |
| 18 | NiCuFe/SiO₂ | 259 | 65 | 89 |

The total conversion of guaiacol ($X_{GUA}$, %) and HDO degree (HDO, %) were defined as in Examples 4-13.

Examples 19-22

The catalyst containing, wt. %: 60 Ni, 9 Cu, 1 Pd and 30 of stabilizer, prepared by the same way as described in Example 4) was reduced in a hydrogen (hydrogen flow rate 10 l/h) by raising the temperature up to 300° C. with the heating rate of 10° C./min and kept at that temperature for 2 h. The amount of hydrogen was taken in excess over the amount required for the complete reduction of the active components of the catalyst.

0.4 g of the catalyst was tested in a flow fixed bed reactor at a hydrogen pressure of 10 bar, temperature of 300° C. and load of LHSV=1 h⁻¹ in anisole HDO. The main reaction products were benzene, toluene, methylcyclohexane and cyclohexane.

Data on the composition, activity and selectivity of the catalysts, as well as their specific surface areas (BET) are given in Table 3.

TABLE 3

| Example | Sample* | $S_{BET}$, m²/g | Conversion, % | HDO, % |
|---|---|---|---|---|
| 19 | NiCuPd/SiO₂ | 400 | 97 | 100 |
| 20 | NiCuPd/WO₂ | 110 | 92 | 100 |
| 21 | NiCuPd/V₂O₅ | 76 | 86 | 79 |
| 22 | NiCuPd/MnO₂ | 70 | 72 | 81 |

The total conversion of guaiacol ($X_{GUA}$, %) and HDO degree (HDO, %) were defined as in Examples 4 to 18.

Example 23

HDO reaction using pyrolysis oil (forestry residues oil provided by VTT, Espoo, Finland; pine wood derived oil from BTG, Enschede, The Netherlands) was performed in a batch reactor (Autoclave Engineers, USA) with the volume of 100 mL equipped with the electrical heating system, magnetic stirrer and a temperature control thermocouple. A liquid feed system was applied to fill the reactor with the guaiacol after catalyst activation (without opening of the reactor) to avoid the catalyst deactivation by contact with air. The operating conditions for the catalyst activation (reduction) were the following: the catalyst containing wt. %: 60 Ni, 5 Cu, 5 Fe and 30 CeO₂—ZrO₂, prepared by the same way as described in Example 1 in the amount of 0.8 g was introduced to the reactor, the reactor was closed and pressurized to 10 bar with H₂ at room temperature, then the reactor was heated up to 320° C. with the heating rate of about 10° C./min and the final temperature was kept for 30 min. After the reduction the pressure was released, the reactor was cooled to room temperature and 25 mL of pyrolysis oil was fed through the feeding line. The temperature and hydrogen pressure was increased gradually until the condition 350° C. of temperature and 200 bar of H₂ pressure was reached. The HDO reaction was carried out for 1 h in a batch mode while stirring (no H₂ is fed to the system during reaction). After reaction (4 h) the reactor was cooled to room temperature, the pressure was released and the liquid and gas products were taken to the analysis. After the reaction the oxygen content in the products decreased from 40 wt. % (in the original oil) to 12 wt. %.

Example 24

The catalyst containing, wt. %: 50 Ni, 10 Cu, 10 Co and 30 of $SiO_2$, prepared by the same way as described in Example 4, was tested in HDO of pyrolysis oil under the same conditions as described in Example 23. After the reaction, the H/C atomic ratio of the products increased from 1.45 (in the original oil) to 1.48 (in the treated product).

Example 25

The catalyst containing, wt. %: 60 Ni, 9 Cu, 1 B and 30 of $Al_2O_3$, prepared by the same way as described in Example 4, was tested in HDO of pyrolysis oil under the same conditions as described in Example 23. After the reaction, the H/C atomic ratio of the products increased from 1.45 (in the original oil) to 1.52 (in the treated product).

Example 26

Hydrotreating of ethylcaprate was performed in a flow fixed bed reactor (internal diameter 5 mm) made of stainless steel, at a temperature of 260° C., H₂ pressure of 50 bar. Before the actual reactions, the catalyst was reduced prior to use (T=300° C. under 10 bar H₂ for 2 h). The catalyst used was wt. %: 55 Ni, 10 Cu, 5 Fe and 30 of $ZrO_2$, prepared by the same way as described in Example 1. The HDO degree was 97%, conversion degree—100%. The main products were nonane (selectivity 96%) and decyl alcohol (selectivity 3%). As can be seen from the above examples, the proposed catalysts allows to obtain high yields of products with the low oxygen content in the process of treatment of oxygen containing organic materials derived from plant biomass, primarily phenol derivatives—products of fast pyrolysis of wood. Another advantage of the claimed catalyst systems is that the catalysts do not contain sulfur, thus enhancing the stability of these systems in processes of oxygen-containing organic materials with low sulfur content.

Examples 27-32

Examples 27 and 28 are prepared by impregnating with salt solutions on commercial (Sasol) $Al_2O_3$ support and $CeO_2$—$ZrO_2$ mixed oxide by precipitation. Examples 29-32 were prepared in the same way as described in Example 4. In order to test the catalysts, guaiacol conversions were measured on single hydrotreatment according to the present invention for which results are presented in Table 4. It shows the highest activity for hydrodeoxygenation for the catalyst prepared by the sol-gel method, likely due to the high percentage of the finely divided active components as reduced films on the surface of the silicate structure and not blocked by the silica.

TABLE 4

| Example | Sample* | Ni (wt. %) | Cu (wt. %) | $A_{BET}$ (m²/g) | Conversion (%) | HDO (%) |
|---|---|---|---|---|---|---|
| 27 | NiCu/Al₂O₃ | 14.1 | 5.7 | 109 | 80 | 71 |
| 28 | NiCu/CeO₂ (21.5%)—ZrO₂ (37.8%) | 30.3 | 10.4 | 82 | 94 | 33 |
| 29 | NiCu/SiO₂ (11.7%)—ZrO₂(39%) Promoted with La (0.8 wt. %) and calcined at 600° C. | 36.5 | 2.3 | 66 | 86 | 96 |
| 30 | Ni/SiO₂ | 55.4 | — | 216 | 98 | 97 |
| 31 | NiCu/SiO₂ | 57.9 | 7 | 142 | 87 | 91 |
| 32 | Ni/SiO₂ | 64.2 | — | 38 | 97 | 30 |

Example 33

A catalyst containing nickel was tested over bio-oil, the catalyst prepared similar to example 4, but here also containing $ZrO_2$ as a stabilizing agent and $La_2O_3$ as promoter. For the preparation of $Ni/SiO_2/ZrO_2$—$La_2O_3$, the appropriate amount of commercial $NiCO_3 \cdot mNi(OH)_2 \cdot nH_2O$ and 25% $NH_3$ solution were dissolved in water and stirred for 4 h. Subsequently a solution of ethyl silicate in ethyl alcohol was added to the suspension and the obtained solution was stirred for 4 hr. Then, during stirring, the solution was heated to 80° C. until a viscous mixture was formed. This mixture was dried at 120° C. for 4 h during which a solid was obtained. Next, the sample is calcined, while increasing the temperature from room temperature to 400° C. with the heating rate of 5° C./min, and keeping it at 400° C. for a further 2 hr. After that the material is cooled down to the room temperature. Next the sample was impregnated with the appropriate amount of ZrO(NO₃)₂·2H₂O and La(NO₃)₃·6H₂O water solution, then the sample is calcined, while increasing the temperature from room temperature to 400° C. with the heating rate of 5° C./min, and keeping it at 400° C. for a further 2 hr. The final composition of the catalyst is NiO—62.7 wt. %(Ni 49.3 wt %), zirconia—21.1 wt. %, La₂O₃—1.17 wt %, SiO₂—remaining.

Experiments are carried out similar to example 1 in a continuously operated packed bed reactor using a pyrolysis oil derived from pine wood, with a feed flow rate of approx. 100 g/h. Approximately 120 grams of catalyst was used in four separate segments of a reactor, and each segments of this reactor is individually heated to a temperature ranging from 80 to 350° C. Data in FIG. 5 show the effect of deoxygenation on the amount of carbonyl groups remaining in the oils, determined upon by a well-known back-titration method. The carbonyl compounds content (aldehydes and ketones) is determined by adding hydroxylamine. HCl to a certain amount of the liquid smoke concentrate in the presence of isopropyl alcohol, after which the equivalent amount of hydrochloric acid, liberated in the reaction with the carbonyl compounds, is determined by titration with N sodium hydroxide solution. The amount of carbonyl compounds in the liquid smoke concentrate is expressed in mg butanone/g.

The degree of deoxygenation here is obtained by feeding the oil together with pure hydrogen over four catalyst beds at 200 and 220 bar and an total weight hourly space velocity of around 1.2 kg$_{oil}$/(h kg$_{cat}$), but varying the bed exit temperatures 80° C. up to 350° C. Given on the x-axis are the temperatures applied for reactors 1 to 4 respectively, where at these space velocities at temperatures >180° C. exit temperatures, phase separation occurs yielding an organic (in blue color) and aqueous phase (red color) is obtained. The sample is Ni/ZrO₂, wherein the nickel oxide content is Ni 49.3 wt %

FIG. 6 shows a drastic reduction in the carbonyl content, from an initial value around 160 mg/l down to 5-15 mg mg/l (in butanon equivalents). Already upon a mild treatment at 80° C. in all four reactors, the carbonyl content is shown to be reduced considerably down to around 40 mg BuO/g, effectively yielding a material much more stable than the original bio-oil as will be shown as well in example 37.

Example 34

Similar experiments have been carried out using oil that has been fractionated, first by adding water to the oil in a ratio of water:oil=1:1, separating the aqueous phase from the lignin phase ('lignitic fraction') and finally evaporating a acid-water rich phase leaving a syrup rich phase. The amount of syrup per kg bio-oil is around 330 gram, or 3 g oil is required for 1 g of syrup. This syrup phase is diluted with water in 1:1 basis, and fed over the catalysts at conditions similar as in Example 33. The lignitic fraction of the oil shows a very low carbonyl content of 2-10 mg/l, suggesting that all carbonyl are in the syrup phase, which is further proven by calculating the theoretical carbonyl content of the syrup phase (diluted in 1:1 water) of 160 $mg/g_{pure\ oil} \times 3$ g $oil/g_{pure\ syrup} * 0.5$ $g_{pure\ syrup}/g_{diluted\ syrup} = 240$ $mg/g_{diluted\ syrup}$. The carbonyl content of the diluted syrup is measured 220 $mg/g_{diluted\ syrup}$.

The effect of the process conditions on the carbonyl content are given in FIG. 6. Similar as in example 33, upon a limited increase in temperature to 80° C. in all four reactors, a drastic decrease in carbonyl content is observed, eventually reaching a reduction down to <10 mg/g at temperatures of 250° C. FIGS. 5 and 6 show that the syrup fraction containing the sugars and sugar derivatives are hydrogenated effectively by reducing the carbonyl content.

Example 35

Similar experiments have been carried out on the lignitic fraction derived from example 34. In this case, the 'pure' lignitic fraction was fed as is with approx. 10 wt. % water over the catalyst used in example 34 at conditions similar as in Example 34. As the carbonyl content is already very low (and remains below <10 $mg/g_{lignins}$ for all samples derived from this lignitic fraction), the MCRT values are reported here. FIG. 7 shows that over the complete temperature interval up to 250° C. exit temperature, no significant effect can be seen on the decrease in the MCRT values of the product. Only upon increasing the exit temperature to 350° C. a reduction in MCRT is observed. Similar conclusions can be drawn from the observed limited amount of hydrogen consumed at temperatures <300° C., viz. <100 NL/kg oil for the lignitic fraction compared with a value >200 NL/kg for the syrup fraction in example 34 or the oil in example 33a. The H/C (wt. %/wt. %) remains rather constant, in the range of 1.43 to 1.47 (calculated on 'dry' organic phase). This suggest that up to temperatures <300° C. no significant (positive or negative) effect is seen on the quality of the lignitic fraction, in terms of MCRT value, carbonyl content or in hydrogen content, which coincides with remarks presented that phenolic components are stable and cannot represent unstable bio-oil.

Example 36

Visually, the oils derived over the catalysts at temperatures >250° C. in example 33 are transparent. FIG. 8 shows a picture of the resulting oils derived over a Ni-catalyst similar as used in examples 33-35, but now in an autoclave, starting with 85 bar initial $H_2$ pressure, keeping the oil for 4 h at 350° C., and for an oil derived at exactly similar conditions but then over a commercial catalyst Ru/C. Using the conventional catalysts as comparison, for example using Ru/C, $CoMo/Al_2O_3$, $NiMo/Al_2O_3$, $Ni/Al_2O_3$, $Ni/SiO_2$—$Al_2O_3$ with a metal content in lower than 35 wt. % relative to the total weight of the catalyst, dark colored non-transparent liquids are obtained, while over the catalysts prepared as described here red-colored transparent oils are obtained.

Example 37

Catalyst can be further improved using La as a promoter, and taking different supports such as $ZrO_2$, able to withstand the harsh conditions of the bio-oil treatment. Example 37 shows the composition of the catalyst used in a packed bed, similar as in example 33. For the preparation of $NiCu/SiO_2$—$ZrO_2$—$La_2O_3$ catalyst, the appropriate amounts of commercial $NiCO_3.mNi(OH)_2.nH_2O$, $CuCO_3.mCu(OH)_2$ and 25% $NH_3$ solution were dissolved in water and stirred for 4 h. Subsequently a solution of ethyl silicate in ethyl alcohol was added to the suspension and the obtained solution was stirred for 4 h. Then, during stirring, the solution was heated to 80° C. until a viscous mixture was formed. This mixture was dried at 120° C. for 4 h during which a solid was obtained. Next, the resulting catalyst is calcined, while increasing the temperature from room temperature to 400° C. with the heating rate of 5° C./min, and keeping it at 400° C. for a further 2 h. After that the material is cooled down to the room temperature. Next the sample was impregnated with the appropriate amount of $ZrO(NO_3)_2.2H_2O$ and $La(NO_3)_3.6H_2O$ water solution, then the sample is calcined, while increasing the temperature from room temperature to 400° C. with the heating rate of 5° C./min, and keeping it at 400° C. for a further 2 h. The sample prepared can be designated by $NiCu/ZrO_2$—$SiO_2$, more specifically Ni(46.4 wt. %)-Cu (5 wt. %)/$ZrO_2$ (10.7 wt. %)-$SiO_2$ (24 wt. %), wherein promoted with La 0.03 wt % and additionally calcined.

For the catalyst data represented in FIG. 9, the effect of deoxygenation is shown as a function of the acidity of the produced organic oil phase (TAN number, or total acid number, as derived from conventional methods for quantifying the naphthenic corrosion and defined as number of milligrams of KOH to neutralize the acids in one gram of oil) and the amount of carbonyl groups in the oils, as established according to example 33-35. The TAN is the amount of potassium hydroxide (KOH) in milligrams that is needed to neutralize the acids in one gram of oil. ASTM D664 measures acidic constituents using a potentiometer to determine the end point. To prepare the sample, a mixture (=TAN solvent) of toluene (50%), isopropyl alcohol (49.5%) and water (0.5%) is dissolved into a sample. Potassium hydroxide is then titrated into the solution. The potentiometer output is monitored while the KOH is titrated into the solution. If the inflection is indistinguishable, the buffer potential will be considered to be the AN. The inflection point is commonly used on new oil. For used oils, however, the inflection may become indistinguishable, requiring the use of the buffer potential as the end point.

The degree of deoxygenation is obtained by feeding the oil over four catalyst beds at 200 bar and an total weight hourly space velocity of around 1 $kg_{oil}/(h\ kg_{cat})$, but varying the bed exit temperatures 80° C. up to 350° C. In all experiments the first two reactor sections were kept at 80° C., while the $3^{rd}$ and $4^{th}$ were varied from 80-250 for the $3^{rd}$ reactor and 80-350° C. for the $4^{th}$ reactor) respectively.

FIG. 9 shows that over the range of oxygen content in the organic phase the acidity is not affected by the stabilization method for the oil, but the carbonyl content is reduced considerably, from an initial value around 150 mg/l down to 5-15 mg mg/l (in butanone equivalents). Already upon a mild treatment at 80° C. in all four reactors, the carbonyl content is shown to be reduced considerably, effectively yielding a material much more stable than the original bio-oil. The consequence is shown in FIG. 9, where the initial value for coking (MCRT, as described by ASTM D 4530, D 189, D 6751; IP 398; ISO 10370, 6615; DIN 1551; GB/T 17144; JIS K 2270) for the original bio-oil of around 18 wt. % is reduced considerably already upon a mild treatment of the oil to values around 10 wt. %. Upon more severe conditions, the oil is further cracked, yielding MCRT values <5 wt. %, but having an oxygen content in the oil of around 25 wt. %. The MCRT values have been determined in a MCRT device supplied by Alcor (MCRT-160).

The invention claimed is:

1. Process for the hydrotreatment of a vegetal biomass comprising:
   a) subjecting said vegetal biomass to a hydrotreatment in a first reactor, said hydrotreatment comprises contacting said vegetal biomass in an aqueous medium and a metal oxide, a mixed metal oxide, or a metal-metalloid oxide catalyst comprising at least 35% by weight of metal oxide, mixed metal oxide, or metal-metalloid oxide relative to the total weight of the catalyst, with hydrogen at a pressure in the range of 10 to 400 bar and at a temperature in the range of 50° C. to 300° C. until a predetermined level of the hydrotreatment of said biomass is obtained and wherein the metal oxide, a mixed metal oxide, or a metal-metalloid oxide catalyst comprises nickel;
   b) subjecting the mixture of step a) to a second hydrotreatment in a second reactor and contacting the hydrotreated vegetal biomass in an aqueous medium, and the catalyst of step a), or a different catalyst, with hydrogen at the pressure range of step a) and at a temperature equal to, or higher than the temperature of step a) and in the range of 50° C. to 450° C., until a predetermined level of second hydrotreatment of said biomass is obtained; and
   c) subjecting the mixture of step b) to a third hydrotreatment in a third reactor and contacting the hydrotreated vegetal biomass in an aqueous medium, and the catalyst of step a), or a different catalyst, with hydrogen at the pressure range of step a) and/or step b) and at a temperature equal to, or higher than the temperature of step b) and in the range of 50° C. to 450° C., until a predetermined level of third hydrotreatment of said biomass is obtained.

2. Process according to claim 1, wherein the process further comprises:
   d) subjecting the mixture of step c) to a fourth hydrotreatment in a fourth reactor and contacting the hydrotreated vegetal biomass in an aqueous medium, and the catalyst of step a), or a different catalyst, in an aqueous medium with hydrogen at the pressure range of step a) and/or step b) and/or step c) and at a temperature equal to, or higher than the temperature of step c), and in the range of 50° C. to 450° C., until a predetermined level of fourth hydrotreatment of said biomass is obtained.

3. Process according to claim 2, wherein step d) is repeated one or more times.

4. Process according to claim 1, wherein the mixed metal oxide, or metal-metalloid oxide catalyst comprises at least one other element chosen from the group consisting of Group 6, 8, 9, 10, 11 and 13 element from the Periodic Table.

5. Process according to claim 1, wherein the metal oxide, mixed metal oxide, or metal-metalloid oxide catalyst comprises at least 40% by weight of metal oxide or metal-metalloid oxide relative to the total weight of the catalyst.

6. Process according to claim 1, wherein the metal oxide, mixed metal oxide, or metal-metalloid oxide catalyst comprises at most 80% by weight of nickel relative to the total weight of the catalyst.

7. Process according to claim 1, wherein the mixed metal oxide, or metal-metalloid oxide catalyst comprises nickel and at least one element selected from the group consisting of Mo, W, Fe, Co, Pd, Cu, B, Al, Ga, In, and Tl.

8. Process according to claim 1, wherein the mixed metal oxide, or metal-metalloid oxide catalyst comprises nickel and copper or cobalt.

9. Process according to claim 1, wherein the catalyst comprises a stabilizing agent.

10. Process according to claim 9, wherein the catalyst comprises a stabilizing agent in amount of at most 35% by weight of the catalyst.

11. Process according to claim 9, wherein the stabilizing agent is selected from the group consisting of $Al_2O_3$, $SiO_2$, $ZrO_2$, $CeO_2$, $TiO_2$, $Cr_2O_3$, $MoO_2$, $WO_2$, $V_2O_5$, $MnO_2$, $La_2O_3$ and a mixture thereof.

12. Process according to claim 1, wherein the vegetal biomass is pretreated at a temperature ranging 200° C.

13. Process according to claim 1, wherein the vegetal biomass is derived from a material containing lignitic and/or hemi-cellulosic and/or cellulosic materials.

14. Process according to claim 1, wherein the temperature in step a) is in the range 50° C. to 250° C.

15. Process according to claim 1, wherein the temperature in step b), c) and d) is in the range 50° C. to 350° C.

16. Process according to claim 1, wherein the pressure is in the range 10 bar to 350 bar.

17. Metal oxide, mixed metal oxide or metal-metalloid oxide catalyst, obtainable by a process comprising:
   1) mixing hydrated metal oxides a $NH_3$ aqueous solution
   2) adding a solution of a $C_1$-$C_6$ alkyl silicate in a $C_1$ to $C_6$-alkyl alcohol;
   3) impregnating with $ZrO(NO_3)_2 \cdot 2H_2O$ and $La(NO_3)_3 \cdot 6H_2O$ in water;
   4) drying the obtained product; and
   5) calcining the product obtained in 4) at a temperature in the range 350° C. to 900° C.

18. Mixed metal oxide or metal-metalloid oxide catalyst according to claim 17, comprising nickel, with the general formula:

wherein $M_i$ is an element different from Ni chosen from the group consisting of Group 6, 8, 9, 10, 11 and 13 element from the Periodic Table, n is $1 \leq n \leq 5$, and wherein the atomic ratio $Ni/\Sigma_{i=1}^{n} M^i$ is in the range 0.01 to 99, and wherein the total weight of metal, metals or metal-metalloid is at least 35% by weight of metal oxide, mixed metal oxide, or metal-metalloid oxide relative to the total weight of the catalyst.

19. Mixed metal oxide or metal-metalloid oxide catalyst according to claim 17, wherein the catalyst comprises nickel, with the general formula:

$$Ni\sum_{i=1}^{n} M^i O$$

wherein $M_i$ is an element different from Ni chosen from the group consisting of Group 6, 8, 9, 10, 11 and 13 element from the Periodic Table, n is $1 \leq n \leq 5$, and wherein the atomic ratio $Ni/\Sigma_{i=1}^{n} M^i$ is in the range 0.01 to 99, and wherein the total weight of metal, metals or metal-metalloid is at least 35% by weight of metal oxide, mixed metal oxide, or metal-metalloid oxide relative to the total weight of the catalyst.

20. Mixed metal oxide or metal-metalloid oxide catalyst according to claim 17, wherein the at least one or two other element (s) is/are selected from the group consisting of Mo, W, Fe, Co, Pd, Cu, B, Al, Ga, In, and Tl.

21. Mixed metal oxide or metal-metalloid oxide catalyst according to claim 17, wherein the catalyst is selected from an oxide of the group consisting of NiCu, PdNi, NiB, NiMo, NiW, NiCuFe, NiCuGa, NiCuTl, PdNiCu, NiCuB, NiCuCo, NiCoFe, NiMoW, NiCuCoFe, and NiFeInGa.

22. Mixed metal oxide or metal-metalloid oxide catalyst according to claim 17, wherein the catalyst comprises a stabilizing agent in amount of not more than 35% by mass of the catalyst and is selected from the group consisting of $Al_2O_3$, $SiO_2$, $ZrO_2$, $CeO_2$, $TiO_2$, $Cr_2O_3$, $MoO_2$, $WO_2$, $V_2O_5$, $MnO_2$, $La_2O_3$, and a mixture thereof.

\* \* \* \* \*